(12) United States Patent
Ogink et al.

(10) Patent No.: US 11,304,555 B2
(45) Date of Patent: Apr. 19, 2022

(54) SYSTEM AND APPARATUS FOR PREPARING A BEVERAGE

(71) Applicant: KONINKLIJKE DOUWE EGBERTS B.V., Utrecht (NL)

(72) Inventors: Judith Margreet Hanneke Ogink, Putten (NL); Marjan Cornelissen, Drachten (NL); Peter Rijskamp, Gaggio Montano (IT); Klaas Kooijker, Drachten (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 329 days.

(21) Appl. No.: 16/261,477

(22) Filed: Jan. 29, 2019

(65) Prior Publication Data
US 2019/0343325 A1 Nov. 14, 2019

Related U.S. Application Data

(63) Continuation of application No. PCT/NL2017/050512, filed on Aug. 3, 2017.

(30) Foreign Application Priority Data

Aug. 3, 2016 (NL) ........................... 2017283

(51) Int. Cl.
*A47J 31/06* (2006.01)
*A47J 31/40* (2006.01)
(Continued)

(52) U.S. Cl.
CPC ......... *A47J 31/407* (2013.01); *A47J 31/0647* (2013.01); *A47J 31/3676* (2013.01); *A47J 31/4403* (2013.01)

(58) Field of Classification Search
CPC ................ A47J 31/0642; A47J 31/0647; A47J 31/3623; A47J 31/3676; A47J 31/4403
(Continued)

(56) References Cited

U.S. PATENT DOCUMENTS

| 4,775,048 A | 10/1988 | Baecchi |
| 4,787,299 A | 11/1988 | Levi |

(Continued)

FOREIGN PATENT DOCUMENTS

| AU | 2013305155 | 3/2015 |
| CA | 2765324 | 11/2010 |

(Continued)

OTHER PUBLICATIONS

International Preliminary Report on Patentability, PCT/NL2017/050509, 7 pages (dated Feb. 5, 2019).
(Continued)

*Primary Examiner* — Reginald Alexander
(74) *Attorney, Agent, or Firm* — Fitch, Even, Tabin & Flannery LLP

(57) ABSTRACT

A system for preparing a quantity of beverage suitable for consumption includes a second exchangeable capsule having a second body with a second flange-like rim and a second exit face attached to the second flange-like rim. The system further includes an apparatus for preparing a quantity of beverage suitable for consumption having a first brew chamber part having a cavity for holding the second exchangeable capsule and a second brew chamber part for closing the first brew chamber part around the second exchangeable capsule. The first brew chamber part has a first substantially annular abutment surface in the cavity and further has a second substantially annular abutment surface. A diameter of the second annular abutment surface is larger than a diameter of the first annular abutment surface. The (Continued)

US 11,304,555 B2

Page 2 second abutment surface is arranged for abutting the second flange-like rim there against when the cavity holds the second exchangeable capsule.

18 Claims, 13 Drawing Sheets

(51) Int. Cl.
*A47J 31/44* (2006.01)
*A47J 31/36* (2006.01)

(58) Field of Classification Search
USPC ..................................... 99/284, 295, 302 P
See application file for complete search history.

(56) References Cited

U.S. PATENT DOCUMENTS

| | | | |
|---|---|---|---|
| 5,197,374 A | 3/1993 | Fond | |
| 5,343,799 A | 9/1994 | Fond | |
| 5,964,142 A | 10/1999 | Tio | |
| 6,026,732 A | 2/2000 | Kollep | |
| 7,216,582 B2 * | 5/2007 | Yoakim | A47J 31/0668 99/295 |
| 7,337,704 B2 | 3/2008 | Hammad | |
| 7,607,385 B2 | 10/2009 | Halliday | |
| 8,210,096 B2 | 7/2012 | Fin | |
| 8,365,585 B2 | 2/2013 | Barra | |
| 8,770,095 B2 * | 7/2014 | Pecci | A47J 31/3633 99/295 |
| 8,836,956 B2 | 9/2014 | Jarisch | |
| 8,904,922 B2 | 12/2014 | Pagano | |
| 9,167,934 B2 | 10/2015 | Höglauer | |
| 9,439,532 B2 * | 9/2016 | Crarer | A47J 31/0668 |
| 9,801,494 B2 | 10/2017 | Castellani | |
| 9,986,869 B2 | 6/2018 | Bonacci | |
| 2001/0011502 A1 | 8/2001 | Bonanno | |
| 2002/0023543 A1 | 2/2002 | Schmed | |
| 2003/0066431 A1 | 4/2003 | Fanzutti | |
| 2004/0197444 A1 | 10/2004 | Halliday | |
| 2005/0223904 A1 | 10/2005 | Laigneau | |
| 2006/0075902 A1 | 4/2006 | Magno | |
| 2006/0107841 A1 | 5/2006 | Schifferle | |
| 2006/0174769 A1 | 8/2006 | Favre | |
| 2006/0266224 A1 | 11/2006 | Hammad | |
| 2008/0006159 A1 | 1/2008 | Fischer | |
| 2008/0245236 A1 | 10/2008 | Ternite | |
| 2010/0064899 A1 | 3/2010 | Aardenburg | |
| 2011/0000377 A1 | 1/2011 | Favre | |
| 2011/0142996 A1 | 6/2011 | Krueger | |
| 2011/0185910 A1 | 8/2011 | Ryser | |
| 2011/0297005 A1 | 12/2011 | Mariller | |
| 2012/0240779 A1 | 9/2012 | Perentes | |
| 2013/0099597 A1 | 4/2013 | Perentes | |
| 2013/0220138 A1 | 8/2013 | Deuber | |
| 2013/0247774 A1 | 9/2013 | Macchiavelli | |
| 2013/0323366 A1 | 12/2013 | Gerbaulet | |
| 2014/0053734 A1 | 2/2014 | Santi | |
| 2014/0227414 A1 | 8/2014 | Perentes | |
| 2014/0263780 A1 | 9/2014 | Day, Jr. | |
| 2014/0290495 A1 | 10/2014 | Perentes | |
| 2014/0299000 A1 | 10/2014 | Hanneson | |
| 2015/0027375 A1 | 1/2015 | Cha | |
| 2015/0059587 A1 | 3/2015 | Colleoni | |
| 2015/0082989 A1 | 3/2015 | Besson | |
| 2015/0104550 A1 | 4/2015 | Oh | |
| 2015/0147448 A1 | 5/2015 | Lo Foro | |
| 2015/0157169 A1 | 6/2015 | Krüger | |
| 2015/0158665 A1 | 6/2015 | Krüger | |
| 2015/0183577 A1 | 7/2015 | Talon | |
| 2015/0225169 A1 | 8/2015 | Jarisch | |
| 2015/0238039 A1 | 8/2015 | Fischer | |
| 2015/0272375 A1 | 10/2015 | Flick et al. | |
| 2015/0272376 A1 | 10/2015 | Flick | |
| 2015/0272380 A1 | 10/2015 | Flick | |
| 2015/0342394 A1 | 12/2015 | Bonacci et al. | |
| 2016/0045060 A1 | 2/2016 | Flick | |
| 2016/0150907 A1 | 6/2016 | Bolognese et al. | |
| 2016/0157666 A1 | 6/2016 | Brandsma | |
| 2016/0309946 A1 | 10/2016 | Gunstone | |
| 2017/0143157 A1 | 5/2017 | Tentorio | |
| 2019/0167031 A1 | 6/2019 | Rijskamp | |
| 2019/0274467 A1 | 9/2019 | Ogink | |
| 2019/0335940 A1 | 11/2019 | Rijskamp | |
| 2019/0335942 A1 | 11/2019 | Rijskamp | |
| 2019/0343324 A1 | 11/2019 | Rijskamp | |
| 2020/0000265 A1 | 1/2020 | Ogink | |
| 2020/0000268 A1 | 1/2020 | Ogink | |
| 2020/0000271 A1 | 1/2020 | Ogink | |

FOREIGN PATENT DOCUMENTS

| | | |
|---|---|---|
| CN | 1232212 | 10/1999 |
| CN | 1612831 | 5/2005 |
| CN | 101123905 | 2/2008 |
| CN | 101389551 | 3/2009 |
| CN | 100480150 | 4/2009 |
| CN | 201481108 | 5/2010 |
| CN | 101795605 | 8/2010 |
| CN | 102188161 | 9/2011 |
| CN | 102245065 | 11/2011 |
| CN | 103002781 | 3/2013 |
| CN | 103124509 | 5/2013 |
| CN | 202960135 | 6/2013 |
| CN | 103829804 A | 6/2014 |
| CN | 104244780 | 12/2014 |
| CN | 104884368 | 9/2015 |
| CN | 105431358 | 3/2016 |
| CN | 105813958 | 7/2016 |
| DE | 10334526 | 2/2005 |
| DE | 202007002910 | 5/2007 |
| DE | 102005049624 | 7/2007 |
| DE | 202012005191 | 6/2012 |
| DE | 102012010394 | 11/2013 |
| DE | 202015100812 | 5/2016 |
| DE | 202015100813 | 5/2016 |
| DE | 202015100814 | 5/2016 |
| DE | 202015101266 | 6/2016 |
| EP | 0449533 | 10/1991 |
| EP | 0451980 | 10/1991 |
| EP | 1183975 | 3/2002 |
| EP | 1 208 782 A1 | 5/2002 |
| EP | 1360919 | 11/2003 |
| EP | 1518484 | 3/2005 |
| EP | 1555219 | 7/2005 |
| EP | 1559351 | 8/2005 |
| EP | 1767129 | 3/2007 |
| EP | 1842467 | 10/2007 |
| EP | 1859713 | 11/2007 |
| EP | 1859714 B1 | 11/2007 |
| EP | 2033551 | 3/2009 |
| EP | 2071986 | 6/2009 |
| EP | 2071987 | 6/2009 |
| EP | 2230195 A1 | 9/2010 |
| EP | 2374383 B1 | 11/2011 |
| EP | 2409608 | 1/2012 |
| EP | 2409609 | 1/2012 |
| EP | 2471420 | 7/2012 |
| EP | 2656755 | 10/2013 |
| EP | 2687133 | 1/2014 |
| EP | 2 833 766 B1 | 2/2015 |
| RU | 2012128493 A | 1/2014 |
| RU | 2591768 C2 | 7/2016 |
| RU | 2626940 | 8/2017 |
| WO | 0243541 | 6/2002 |
| WO | 2005016092 | 2/2005 |
| WO | 2006005736 | 1/2006 |
| WO | 2006014936 | 2/2006 |
| WO | 2006066625 | 6/2006 |
| WO | 2007016977 | 2/2007 |
| WO | 2007096196 | 8/2007 |
| WO | 2007113100 | 10/2007 |
| WO | 2008004116 | 1/2008 |
| WO | 2008096385 | 8/2008 |

(56) References Cited

FOREIGN PATENT DOCUMENTS

| WO | 2009016455 | 2/2009 |
| WO | 2009027131 | 3/2009 |
| WO | 2010013274 | 2/2010 |
| WO | 2010029512 | 3/2010 |
| WO | 2010076698 | 7/2010 |
| WO | 2010134054 | 11/2010 |
| WO | 2010137953 | 12/2010 |
| WO | 2011015978 | 2/2011 |
| WO | WO-2011/042401 A2 | 4/2011 |
| WO | 2011069830 | 6/2011 |
| WO | 2011076750 | 6/2011 |
| WO | WO-2011/069829 A1 | 6/2011 |
| WO | 2011113854 A2 | 9/2011 |
| WO | 2011121125 | 10/2011 |
| WO | 2012001115 | 1/2012 |
| WO | 2012123440 | 9/2012 |
| WO | 2012156167 | 11/2012 |
| WO | 2013007776 | 1/2013 |
| WO | 2013008012 | 1/2013 |
| WO | WO-2013/079814 A1 | 6/2013 |
| WO | 2013119543 | 8/2013 |
| WO | 2013144922 | 10/2013 |
| WO | 2014012778 | 1/2014 |
| WO | 2014012779 | 1/2014 |
| WO | 2014027079 | 2/2014 |
| WO | 2014029685 | 2/2014 |
| WO | 2014041605 | 3/2014 |
| WO | 2014056641 | 4/2014 |
| WO | 2014056642 | 4/2014 |
| WO | 2014056810 | 4/2014 |
| WO | 2014056821 | 4/2014 |
| WO | 2014060370 | 4/2014 |
| WO | WO-2014/056730 A1 | 4/2014 |
| WO | WO-2014/056862 A1 | 4/2014 |
| WO | 2014082975 | 6/2014 |
| WO | 2014082976 | 6/2014 |
| WO | 2014092406 | 6/2014 |
| WO | 2014096120 | 6/2014 |
| WO | 2014096121 | 6/2014 |
| WO | 2014132158 | 9/2014 |
| WO | 2014174462 | 10/2014 |
| WO | 2014183219 | 11/2014 |
| WO | 2014183783 | 11/2014 |
| WO | 2015004613 | 1/2015 |
| WO | 2015056022 | 4/2015 |
| WO | 2015082663 | 6/2015 |
| WO | 2015082664 | 6/2015 |
| WO | 2015086371 | 6/2015 |
| WO | WO-2015/082662 A1 | 6/2015 |
| WO | WO-2015/109052 A1 | 7/2015 |
| WO | 2015124627 | 8/2015 |
| WO | 2015158838 | 10/2015 |
| WO | WO-2015/144356 A1 | 10/2015 |
| WO | WO-2015/155145 A1 | 10/2015 |
| WO | WO-2015/173123 A1 | 11/2015 |
| WO | WO-2015/193744 A1 | 12/2015 |
| WO | 2016012562 | 1/2016 |
| WO | 2016055633 | 4/2016 |
| WO | 2016071795 | 5/2016 |
| WO | 2016082029 | 6/2016 |

OTHER PUBLICATIONS

International Preliminary Report on Patentability, PCT/NL2017/050510, 7 pages (dated Feb. 5, 2019).
International Preliminary Report on Patentability, PCT/NL2017/050511, 7 pages (dated Feb. 5, 2019).
International Preliminary Report on Patentability, PCT/NL2017/050512, 6 pages (dated Feb. 5, 2019).
International Preliminary Report on Patentability, PCT/NL2017/050513, 6 pages (dated Feb. 5, 2019).
International Preliminary Report on Patentability, PCT/NL2017/050514, 6 pages (dated Feb. 5, 2019).
International Preliminary Report on Patentability, PCT/NL2017/050515, 6 pages (dated Feb. 5, 2019).
International Preliminary Report on Patentability, PCT/NL2017/050519, 9 pages (dated Feb. 5, 2019).
International Preliminary Report on Patentability, PCT/NL2017/050521, 5 pages (dated Feb. 5, 2019).
International Preliminary Report on Patentability, PCT/NL2017/050522, 12 pages (dated Feb. 5, 2019).
Manual Jura Nespresso English, 22 pages.
Nespresso-I, 8 pages.
Nespresso-II, 2 pages (2003).
Nespresso-III, 2 pages (2003).
Nespresso-IV, 7 pages.
Nespresso-V, 5 pages (Apr. 2015).
International Search Report and Written Opinion, PCT/NL2017/050509, 11 pages (dated Jun. 5, 2018).
International Search Report and Written Opinion, PCT/NL2017/050510, 10 pages (dated Nov. 20, 2017).
International Search Report and Written Opinion, PCT/NL2017/050511, 9 pages (dated Nov. 30, 2017).
International Search Report and Written Opinion, PCT/NL2017/050512, 10 pages (dated Nov. 27, 2017).
International Search Report and Written Opinion, PCT/NL2017/050513, 8 pages (dated Dec. 22, 2017).
International Search Report and Written Opinion, PCT/NL2017/050514, 8 pages (dated Nov. 23, 2017).
International Search Report and Written Opinion, PCT/NL2017/050515, 10 pages (dated Nov. 27, 2017).
International Search Report and Written Opinion, PCT/NL2017/050519, 11 pages (dated Nov. 29, 2017).
International Search Report and Written Opinion, PCT/NL2017/050521, 8 pages (dated Dec. 4, 2017).
International Search Report and Written Opinion, PCT/NL2017/050522, 17 pages (dated Jan. 17, 2018).

* cited by examiner

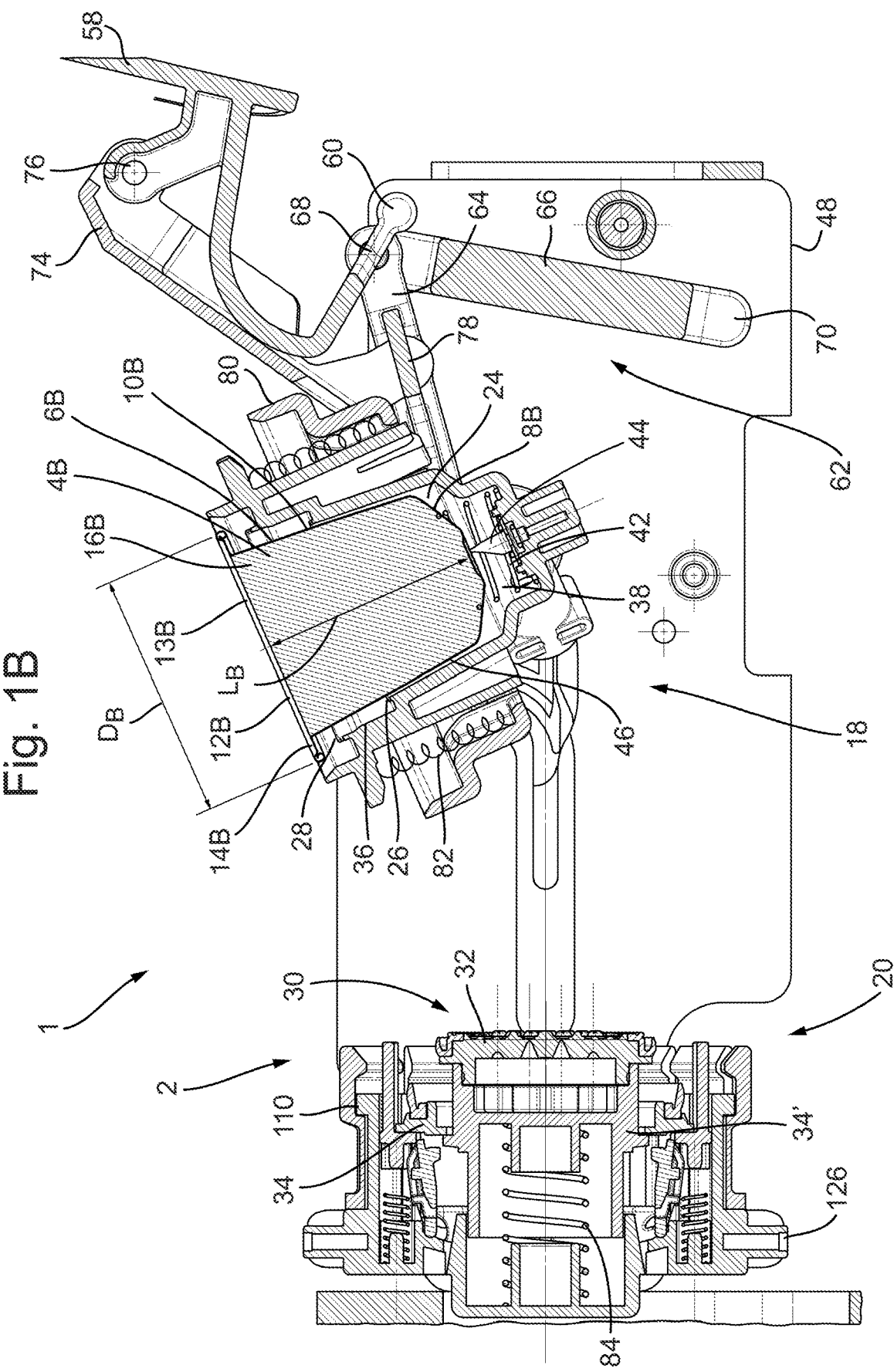

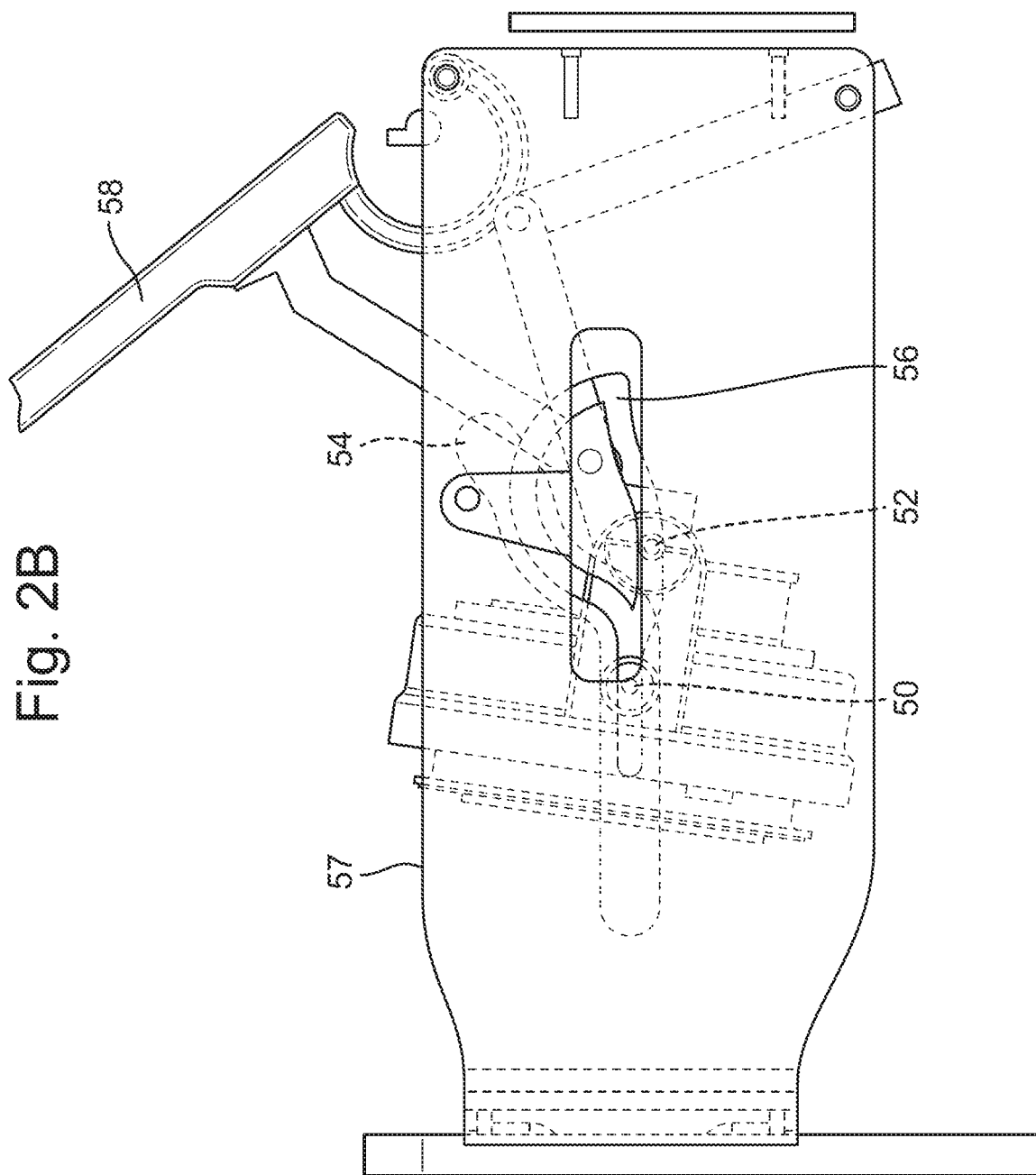

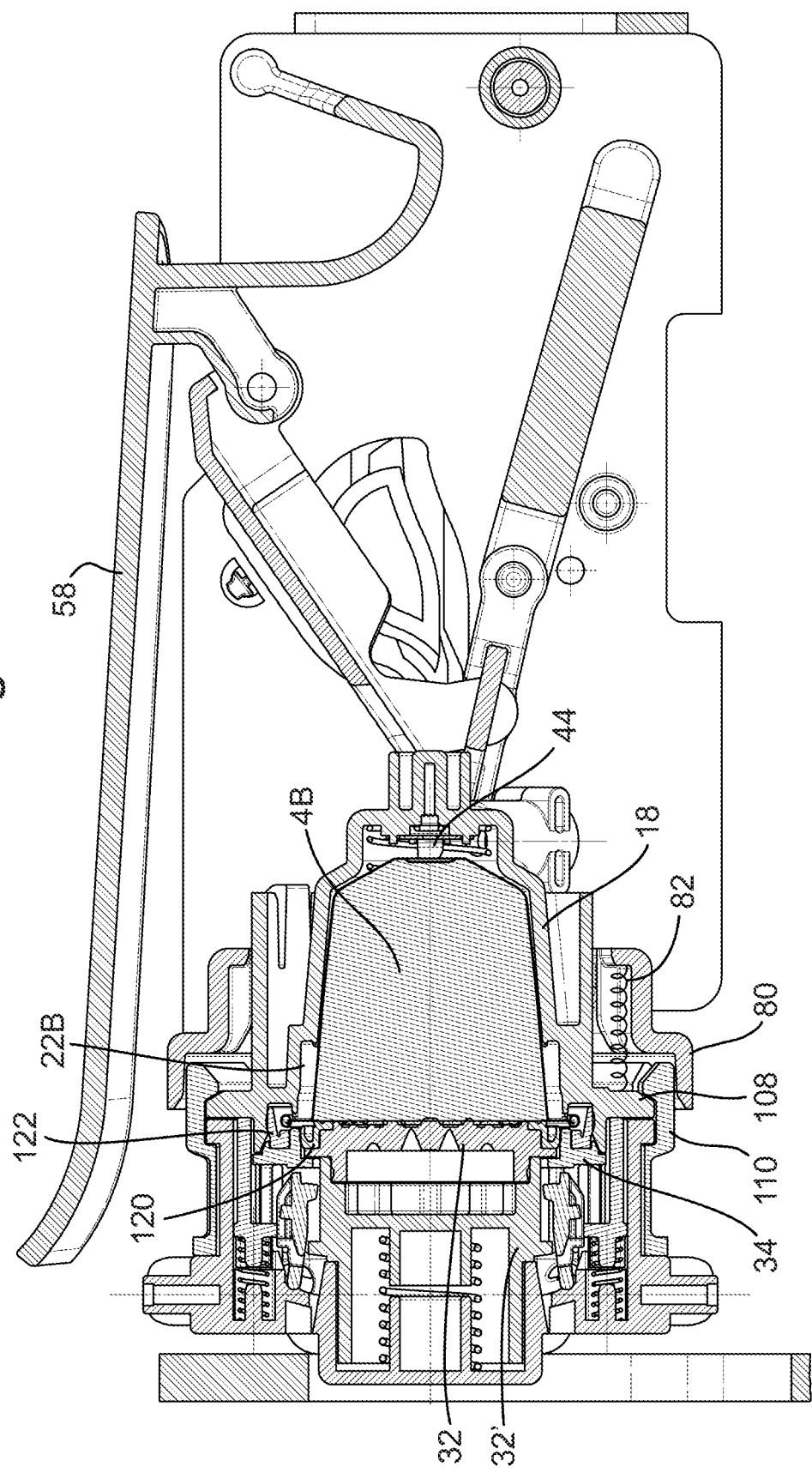

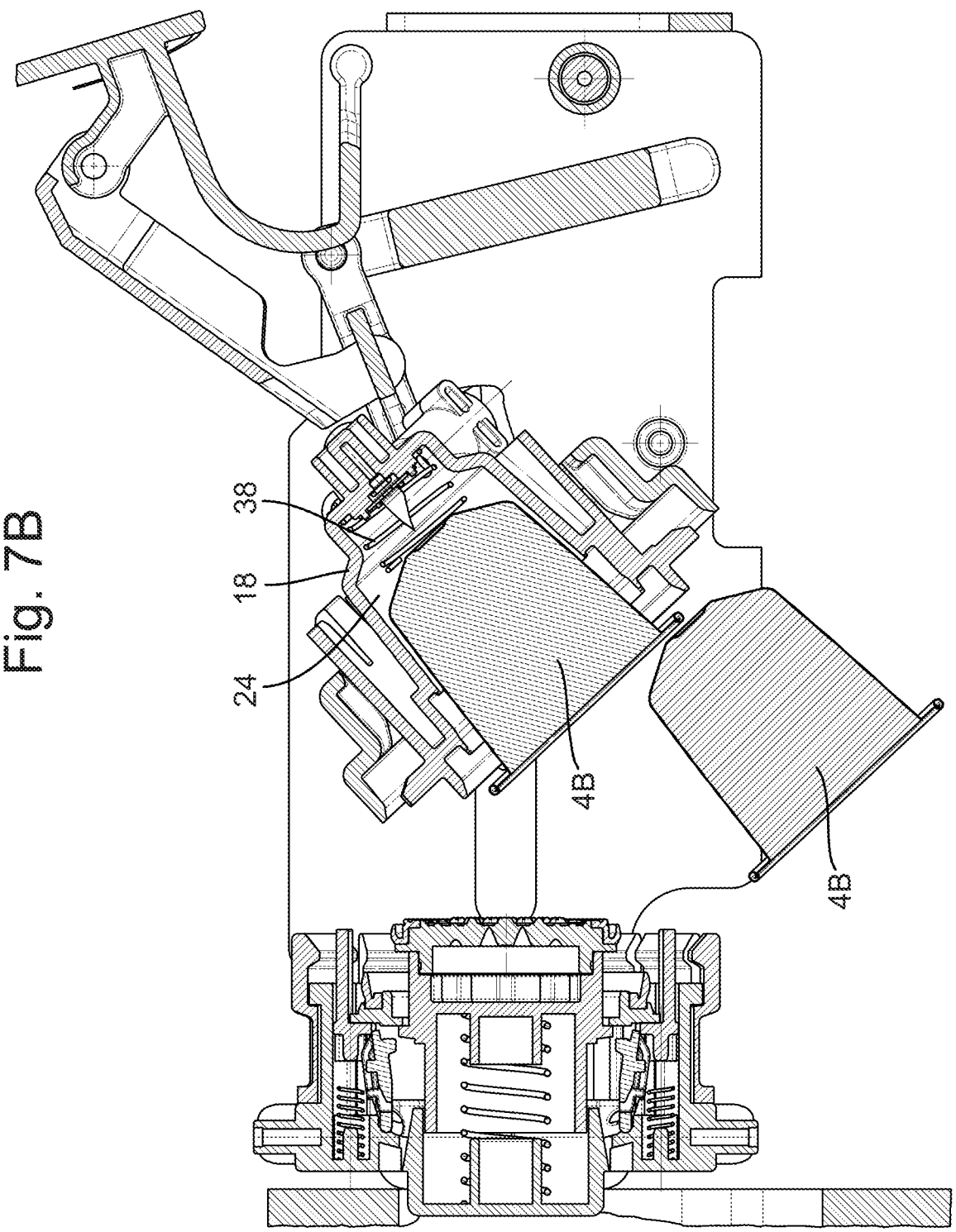

SYSTEM AND APPARATUS FOR PREPARING A BEVERAGE

CROSS-REFERENCE TO RELATED APPLICATION

This application is a continuation of PCT/NL2017/050512 filed Aug. 3, 2017, which claims the benefit of and priority to Netherlands Patent Application No. NL 2017283 filed Aug. 3, 2016, the entire contents of each of which are hereby incorporated herein by reference.

BACKGROUND

The invention generally relates to a system for preparing a beverage. The invention also relates to an apparatus and method for preparing a beverage. More specifically the invention relates to a system for preparing a beverage using a capsule. In particular the invention relates to a system for preparing a quantity of beverage suitable for consumption, including a second exchangeable capsule having a second body with a second flange-like rim and a second exit face attached to the second flange-like rim, and an apparatus for preparing a quantity of beverage suitable for consumption, said apparatus including a first brew chamber part having a cavity for holding the second exchangeable capsule, and a second brew chamber part for closing the first brew chamber part around the second exchangeable capsule, and the first brew chamber part having a first substantially annular abutment surface in the cavity.

A system for preparing a beverage suitable for consumption is known from WO-A1-2015/004613. This known system can use prepackaged capsules having different respective axial lengths. The length of a capsule used is recognized mechanically, and the configuration of the brewing chamber is determined accordingly, as a function of the specific shape of the transverse flange of the capsule used on each occasion. In particular the flange-like rim of each capsule has at least one indentation or protrusion having a perimetric dimension which is correlated with the axial length or height of said capsule. As an example, WO-A1-2015/004613 describes capsules having a flange-like rim having indentations with a width that is inversely proportionate to the length of the capsule. Thus a capsule having a shorter length has indentations of a larger width. The brewing unit of the known system comprises a capsule carrier unit having a receiving element including an essentially cup-shaped central part from which a kind of flange extends radially outwards. Two essentially planar appendages, facing one another horizontally, extend vertically upwards from the flange of the receiving element. The appendages extend transversely outwards and are spaced apart from the cup-shaped central portion of the receiving element. Respective projecting formations in the shape of isosceles triangles extend from the frontally facing surfaces of the appendages, and the arrangement of these appendages is such that two opposed indentations of the flange of a capsule are initially coupled to, and slide along, the oblique sides of the projecting formations of the appendages. As a result of this construction e.g. shorter capsules having wider indentations can penetrate farther between the appendages of the capsule carrier unit before its projecting formations bear on and are stopped by the oblique sides of the projecting formations. The known apparatus is further constructed such that as soon as the protuberances of the flange-like rim of the capsule begin to interfere with the oblique sides of the projecting formations, the capsule starts to drag the receiving element downwards, and that further rotation of a control lever, together with a number of other components of form a brewing chamber with a dimension adapted to the length of the capsule used such that a beverage can be prepared. Although this known system can be uses to prepare a beverage using prepackaged capsules having different respective axial lengths, the construction of the brewing chamber of which the length is adaptable to the length of the capsule used is relatively complicated. Further, since the flange-like rim of all the capsules used comprises indentations the surface area of the flange-like rim is reduced. As a result the contact surface area of the flange-like rim with components of the brewing chamber is reduced, in particular for capsules having a shorter length. Since this contact surface area at least partly provides the sealing between the capsule and the brewing chamber during the brewing operation, the sealing of in particular the capsules of shorter length can be insufficient for using an apparatus in which e.g. hot water is supplied to the capsule under relatively high pressures.

SUMMARY

It thus is an object of the invention to provide a system for preparing a quantity of beverage suitable for consumption which can use capsules having different dimensions in which the brewing chamber can be constructed in a relatively simple manner. It is a further object of the invention to provide a system for preparing a quantity of beverage suitable for consumption which can use capsules having different dimensions in which for each capsule the sealing is sufficient during brewing even when liquid is supplied to the capsule at relatively high pressures. It is still a further object of the invention to provide an alternative system for preparing a quantity of beverage suitable for consumption which can use capsules having different dimensions.

In order to achieve at least on of the objects identified above the invention provides a system for preparing a quantity of beverage suitable for consumption, including a second exchangeable capsule having a second body with a second flange-like rim and a second exit face attached to the second flange-like rim, and an apparatus for preparing a quantity of beverage suitable for consumption, said apparatus including a first brew chamber part having a cavity for holding the second exchangeable capsule, and a second brew chamber part for closing the first brew chamber part around the second exchangeable capsule, and the first brew chamber part having a first substantially annular abutment surface in the cavity, characterized in that the first brew chamber part further has a second substantially annular abutment surface, a diameter of the second annular abutment surface being larger than a diameter of the first annular abutment surface, and in that the second abutment surface is arranged for abutting the second flange-like rim there against when the cavity holds the second exchangeable capsule. By using such a first and a second annular abutment surface the system can be constructed in a relatively simple manner to prepare a quantity of beverage suitable for consumption selectively using a first exchangeable capsule having a flange-like rim dimensioned to abut the first annular abutment surface and a second exchangeable capsule having a flange-like rim dimensioned to abut the second annular abutment surface. In a particular embodiment the system then further includes a first exchangeable capsule having a first body with a first flange-like rim and a first exit face attached to the first flange-like rim, wherein the cavity of the first brew chamber part of the apparatus is arranged for selectively holding one of the first and second exchangeable capsules, wherein the second brew chamber part is arranged for closing the first brew chamber part around the first or second exchangeable capsule, wherein the first abutment surface is arranged for abutting the first flange-like rim there against when the cavity holds the first exchangeable capsule, and wherein the second flange-like rim has a larger diameter than the first flange-like rim. Thus exchangeable capsules having different diameters can be used in the inventive system for preparing a quantity of beverage suitable for consumption.

In an advantageous system according to the invention the first substantially annular abutment surface is spaced from the second substantially annular abutment surface in an axial direction of the first brew chamber part. In particular it is then possible in an embodiment of a system according to the invention that an axial length of the second capsule is larger than an axial length of the first capsule. It is thus possible to use exchangeable capsules having different lengths in the inventive system for preparing a quantity of beverage suitable for consumption.

An embodiment of the system according to the invention can be constructed in a relatively simple manner and relatively compact when the second substantially annular abutment surface is arranged at an open end of the cavity.

In a further embodiment of a system according to the invention the system can be constructed in a relatively simple manner when the first substantially annular abutment surface and the second substantially annular abutment surface are immobile relative to each other. The cavity of the first brew chamber part can be a predetermined cavity arranged for holding the first or second capsule. The cavity can have an invariable shape for holding the first or second capsule. The first brew chamber part can be arranged for holding the first or second capsule without changing a configuration of the first brew chamber part. The first brew chamber part can be a monolithic part.

Preferably the second brew chamber part has an extraction plate for abutting against the second exit face and optionally the first exit face. It is then advantageous from a constructional point of view when the extraction plate includes a central portion and a peripheral portion, the central portion being axially movable relative to the peripheral portion. Preferably the peripheral portion is arranged to abut against the second exit face when the cavity holds the second capsule while brewing, which can aid in providing a proper sealing during brewing. The same is valid when the peripheral portion is arranged to abut against the first brew chamber part when the cavity holds the first capsule while brewing. The central portion can be arranged to abut against the second exit face when the cavity holds the second capsule while brewing, and the central portion can further be arranged to abut against the first exit face when the cavity holds the first capsule while brewing.

When the first and/or second brew chamber part is arranged to seal against the second flange-like rim or optionally the first flange-like rim the system for preparing a quantity of beverage suitable for consumption which can use capsules having different dimensions in which for each capsule the sealing is sufficient during brewing even when liquid is supplied to the capsule at relatively high pressures. Preferably a liquid supply system is included for supplying liquid to the first brew chamber part, wherein the liquid can enter into an interstice between the first brew chamber part and the second capsule or optionally an interstice between the first brew chamber part and the first capsule.

The system according to the invention is in particular suitable when first and second exchangeable capsules are used having substantially the same length to diameter ratio.

In a further embodiment of a system according to the invention the first brew chamber part includes centering means at the bottom of the cavity, wherein the second exchangeable capsule and optionally the first exchangeable capsule are arranged for selectively cooperating with the centering means for selectively centering the first and second exchangeable capsules near the bottom of the cavity. In a still further embodiment of a system according to the invention the first brew chamber part and the first exchangeable capsule are adapted to each other such that the first exchangeable capsule centers in the cavity by means of the flange-like rim. In an even still further embodiment of a system according to the invention the first brew chamber part and the second exchangeable capsule are adapted to each other such that an outer part of the second exchangeable capsule engages the inner circumferential wall of the first brew chamber part when loading the second exchangeable capsule into the first brew chamber part, and wherein the first brew chamber part and the second exchangeable capsule are adapted to each other such that the second exchangeable capsule centers in the cavity by means of the outer part. In these manners capsules can be centered accurately in the brew chamber part thereby facilitating correct brewing.

In an embodiment of a system according to the invention in which the first abutment surface provides the cavity with a stepped shape, the first and second exchangeable capsule can be easily an correctly inserted into the brew chamber part.

In a further embodiment of a system according to the invention the second body is a cup-shaped second body including a second bottom and a second circumferential wall, said cup-shaped second body having a second open end, wherein the second flange-like rim is an outwardly extending second rim continuously circumferentially extending along the second open end of the cup-shaped second body, said outwardly extending second rim substantially having a single second width. Preferably, the first body is a cup-shaped first body including a first bottom and a first circumferential wall, said cup-shaped first body having a first open end, wherein the first flange-like rim is an outwardly extending first rim continuously circumferentially extending along the first open end of the cup-shaped first body, said outwardly extending first rim substantially having a single first width. Such continuously circumferentially extending rims having a single width can during brewing provide a sufficient seal even in case liquid under pressure is supplied to the capsules. In case the first width and the second width are identical the brew chamber part can be constructed in a relatively easy manner. In particular the first generally annular abutment surface can then be continuously annular and the second generally annular abutment surface can then be continuously annular.

The invention further relates to an apparatus for preparing a predetermined quantity of beverage suitable for consumption, the apparatus being arranged for preparing a predetermined quantity of beverage suitable for consumption using a second exchangeable capsule having a second body and a second flange-like rim, the apparatus including a brew chamber part having a cavity for holding the second exchangeable capsule, the brew chamber part having a first annular abutment surface in the cavity, characterized in that the brew chamber part has a second annular abutment surface, the second abutment surface being arranged for abutting the second flange-like rim there against when the cavity holds the second exchangeable capsule and in that a diameter of the second annular abutment surface is larger than a diameter of the first annular abutment surface. Preferably the apparatus is further arranged for preparing a predetermined quantity of beverage suitable for consumption using a first exchangeable capsule having a first body and a first flange-like rim, the cavity of the brew chamber part being arranged cavity for selectively holding one of the first and second exchangeable capsules, the first abutment surface being arranged for abutting the first flange-like rim there against when the cavity holds the first exchangeable capsule. The apparatus is thus suitable for preparing a predetermined quantity of beverage suitable for consumption using a second exchangeable capsule having a second flange-like rim with a larger diameter than the first flange-like rim. In case the first substantially annular abutment surface is spaced from the second substantially annular abutment surface in an axial direction of the first brew chamber part it is possible for the apparatus to use capsules having different lengths.

The apparatus can be constructed relatively simple when the second substantially annular abutment surface is arranged at an open end of the cavity. The apparatus can be further constructed relatively simple when the first substantially annular abutment surface and the second substantially annular abutment surface are immobile relative to each other.

Preferably the second brew chamber part has an extraction plate, which then includes a central portion and a peripheral portion, the central portion being axially movable relative to the peripheral portion.

In an embodiment of an apparatus according to the invention the first brew chamber part includes centering means at the bottom of the cavity for correctly centering the capsule in the brew chamber part.

In a further embodiment of an apparatus according to the invention the first abutment surface provides the cavity with a stepped shape so that capsules of different diameter can be inserted relatively easily. In order to provide a correct sealing even when liquid under pressure is used for brewing the beverage it is preferred that the first generally annular abutment surface is continuously annular and wherein the second generally annular abutment surface is continuously annular.

According to an aspect is provided a method for preparing a quantity of beverage suitable for consumption as described herein.

According to an aspect is provided a capsule, and a set of a first and second capsule as described herein.

It will be appreciated that any of the embodiments, aspects, features and options described in view of the system apply equally to the apparatus, capsules and method. It will also be clear that any one or more of the above embodiments, aspects, features and options can be combined.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the Drawing:

FIGS. 1A and 1B show schematic representations of a system according to the invention;

FIGS. 2A and 2B show the first brew chamber part of the system of FIGS. 1A and 1B in more detail;

FIGS. 6A and 6B show the first capsule in the brew chamber during extraction and the second capsule in the brew chamber during extraction, respectively;

FIGS. 7A and 7B show the first brew chamber part swiveled downwards for ejection of the used first and second capsule, respectively, from the cavity under the effect of gravity.

DETAILED DESCRIPTION

Figure 1A:
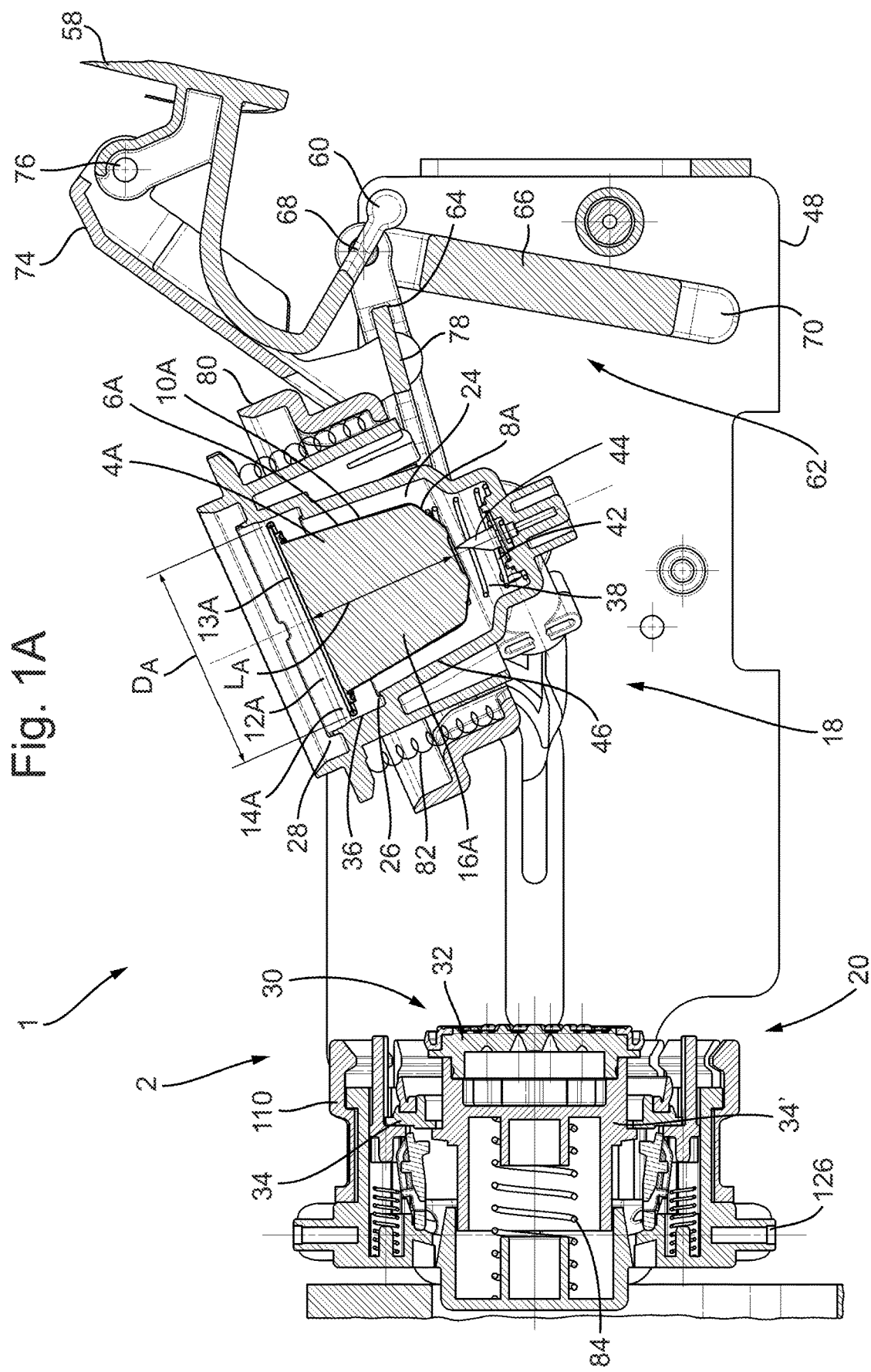

FIGS. 1A and 1B show schematic cross sectional views of a system 1 for preparing a beverage. The system includes an apparatus 2 and an exchangeable capsule. Here the system 1 is arranged for cooperating with a first capsule 4A and a second capsule 4B. The apparatus 2 shown in FIGS. 1A and 1B is one and the same apparatus. The apparatus 2 is arranged for selectively cooperating with either the first capsule 4A (see FIG. 1A) or the second capsule 4B (see FIG. 1B). It will be appreciated that the system 1 can include the apparatus 2, the first capsule 4A and the second capsule 4B.

The first and second capsules 4A, 4B are of a different type. In this example, the second capsule 4B is larger than the first capsule 4A. An axial length LB of the second capsule 4B is larger than an axial length LA of the first capsule 4A. A diameter DB of the second capsule 4B is a larger than a diameter DA of the first capsule 4A. Notwithstanding the differences, in this example the first and second capsules 4A, 4B are designed to make a similar visual impression. The first and second capsules 4A, 4B are designed to have a family look and feel. Here a ratio of the axial length and diameter LA/DA of the first capsule 4A is substantially the same as a ratio of the axial length and diameter LB/DB of the second capsule 4B. Preferably, the length to diameter ratio of the first and second capsules is identical within 20%, preferably within 10%, e.g. identical.

In view of the similarity, both capsules 4A, 4B will now be described simultaneously. In this example, the capsules 4A, 4B both include a cup-shaped body 6A, 6B. Here the cup-shaped body 6A, 6B includes a bottom 8A, 8B and a circumferential wall 10A, 10B. The bottom 8A, 8B and the circumferential wall 10A, 10B can form a monolithic part. The capsules 4A, 4B both include a lid 12A, 12B. The lid 12A, 12B closes off an open end of the cup-shaped body 6A, 6B. The lid 12A, 12B includes an exit area 13A, 13B through which beverage can be drained from the capsule as explained below. In this example the lid 12A, 12B is connected to a flange-like rim 14A, 14B of the capsule 4A, 4B. Here the rim 14A, 14B is an outwardly extending rim. The rim 14A, 14B extend continuously circumferentially along the open end, i.e. do not have interruptions or indentations, and each rim 14A, 14B has one and the same width over its periphery, i.e. the rim has a single, uniform width around its circumference. Although the first width of the rim 14A and the second width of the rim 14B can be different from each other, the widths preferably are identical. The bottom 8A, 8B, the circumferential wall 10A, 10B and the rim 14A, 14B can form a monolithic part. Here the exit area 13A, 13B defines the area of the lid 12A, 12B through which the beverage can potentially exit the capsule 4A, 4B. Hence, an area of the lid 12A, 12B sealed to the rim 14A, 14B does not constitute part of the exit area 13A, 13B. In this example, the capsules 4A, 4B are substantially rotation symmetric around an axis extending from the bottom 8A, 8B to the lid 12A, 12B. The cup-shaped body 6A, 6B and the lid 12A, 12B enclose an inner space 16A, 16B of the capsule. The inner space 16A, 16B includes a quantity of beverage ingredient, such as an extractable or soluble substance. The beverage ingredient can e.g. be roast and ground coffee, tea, or the like. The beverage ingredient can be powdered coffee. The beverage ingredient can be a liquid. In view of the difference in size of the capsules 4A, 4B it will be appreciated that the second capsule 4B can include a larger quantity of beverage ingredient than the first capsule 4A. In this example, the inner space 16B of the second capsule 4B is about twice the inner space 16A of the first capsule 4A. For example, the first capsule 4A may include 4-8 grams, e.g. about 6 grams, of ground coffee. For example, the second capsule 4B may include 8-16 grams, e.g. about 12 grams, of ground coffee.

The cup-shaped body 6A, 6B can be manufactured from a metal foil, such as aluminum foil, a plastics material, such as polypropylene or polyethylene, or a combination thereof. The cup-shaped body 6A, 6B can be manufactured by pressing, deep-drawing, vacuum forming, injection molding or the like. The lid can be manufactured from a metal foil, such as aluminum foil, a plastics material, such as polypropylene or polyethylene, or a combination thereof. In the example the capsules 4A, 4B are so-called closed capsules. This indicates capsules that are hermetically closed prior to insertion into the apparatus. The closed capsules can be opened by the apparatus as described below. Alternatively, non-sealed or refillable capsules could also be used.

The apparatus includes a first brew chamber part 18 and a second brew chamber part 20. The first and second brew chamber parts 18, 20 can be closed against each other to form a brew chamber 22A, 22B (not shown in FIGS. 1A, 1B).

The first brew chamber part 18 includes a cavity 24. The cavity 24 is arranged for receiving the first or second capsule 4A, 4B. Here the cavity 24 of the first brew chamber part 18 is a predetermined cavity 24 arranged for holding the first or second capsule 4A, 4B. Here the cavity 24 has an invariable shape for holding the first or second capsule 4A, 4B. Here the first brew chamber part 18 is arranged for holding the first or second capsule 4A, 4B without changing a configuration of the first brew chamber part 18. In this example the first brew chamber part 18 is a monolithic part. In this example the first brew chamber part 18 includes a first abutment surface 26. The first abutment surface is positioned inside the cavity 24. Here the first abutment surface 26 is a first generally annular abutment surface. The first generally annular abutment surface 26 can be continuously annular, or it may be interrupted annular, such as comprising a plurality of segments along an annulus. The first abutment surface 26 may for example take the shape of one or more, e.g. arched, ridges which protrude into cavity 24. Here the first abutment surface 26 provides the cavity 24 with a stepped shape. In this example the first brew chamber part 18 includes a second abutment surface 28. The second abutment surface is positioned near the open end of the cavity 24. The diameter of the second annular abutment surface 28 is larger than the diameter of the first annular abutment surface 26. Here the second abutment surface 28 is a second generally annular abutment surface. The second generally annular abutment surface 28 can be continuously annular, or it may be interrupted annular, such as comprising a plurality of segments along an annulus. The second abutment surface 28 may for example take the shape of one or more, e.g. arched, ridges. It will be appreciated that the first abutment surface 26 and the second abutment surface 28 are spaced at a mutual distance in an axial direction of the first brew chamber part 18. The first abutment surface 26 and the second abutment surface 28 are positioned at a fixed spacing. The first abutment surface 26 and the second abutment surface are immobile relative to each other. Here, the first brew chamber part 18 includes an ejector 38. In this example the ejector 38 includes a conical ring and/or a resilient element 42, here a helical spring. The first brew chamber part 18 includes piercing means 44 for piercing the bottom of the capsule. Here the piercing means includes a plurality of knives, such as three knives.

The second brew chamber part 20 includes an extraction plate 30. In this example, the extraction plate 30 includes a central portion 32 and a peripheral portion 34. The central portion 32 is movable relative to the peripheral portion 34. Here the central portion 32 is movable in an axial direction of the second brew chamber part 20.

The system 1 as described thus far can be used for preparing a beverage as follows. Further features of the system 1 will be explained along the way.

In the example of FIGS. 1A and 1B the apparatus 2 is in a state ready for receiving a capsule. In FIGS. 1A and 1B the capsule 4A, 4B has just been inserted into the cavity of the first brew chamber part 18. The first brew chamber part 18 is in an inclined position. The open end of the cavity 24 points upwards.

As shown in FIG. 1A, the first capsule 4A can fall into the cavity 24 under the influence of gravity. Herein the rim 14A of the first capsule 4A is guided by an inner surface 36 of the first brew chamber part 18. The bottom 8A of the first capsule 4A lowers into the cavity 24 until it abuts against the ejector 38. Here the bottom 8A of the first capsule 4A centers on the ejector 38. It will be appreciated that the rim 14A of the first capsule 4A is positioned between the first abutment surface 26 and the second abutment surface 28. The bottom 8A of the first capsule 4A is not yet pierced in this state.

As shown in FIG. 1B, the second capsule 4B can also fall into the cavity 24 under the influence of gravity. Herein the circumferential wall 10B of the second capsule 4B is guided by an inner surface 46 of the first brew chamber part 18. The bottom 8B of the second capsule 4B lowers into the cavity 24 until it abuts against the ejector 38. Here the bottom 8B of the second capsule 4B centers on the ejector 38. It will be appreciated that the rim 14B of the second capsule 4B is positioned beyond the second abutment surface 28 when seen from the piercing means 44. The bottom 8B of the second capsule 4B is not yet pierced in this state.

Once the capsule 4A, 4B is inserted into the cavity 24 as shown in FIGS. 1A and 1B, the first brew chamber part 18 can be moved towards the second brew chamber part 20 for closing the brew chamber around the capsule 4A, 4B. The first brew chamber part 18 is guided in a frame 48 of the apparatus.

Figure 2A:
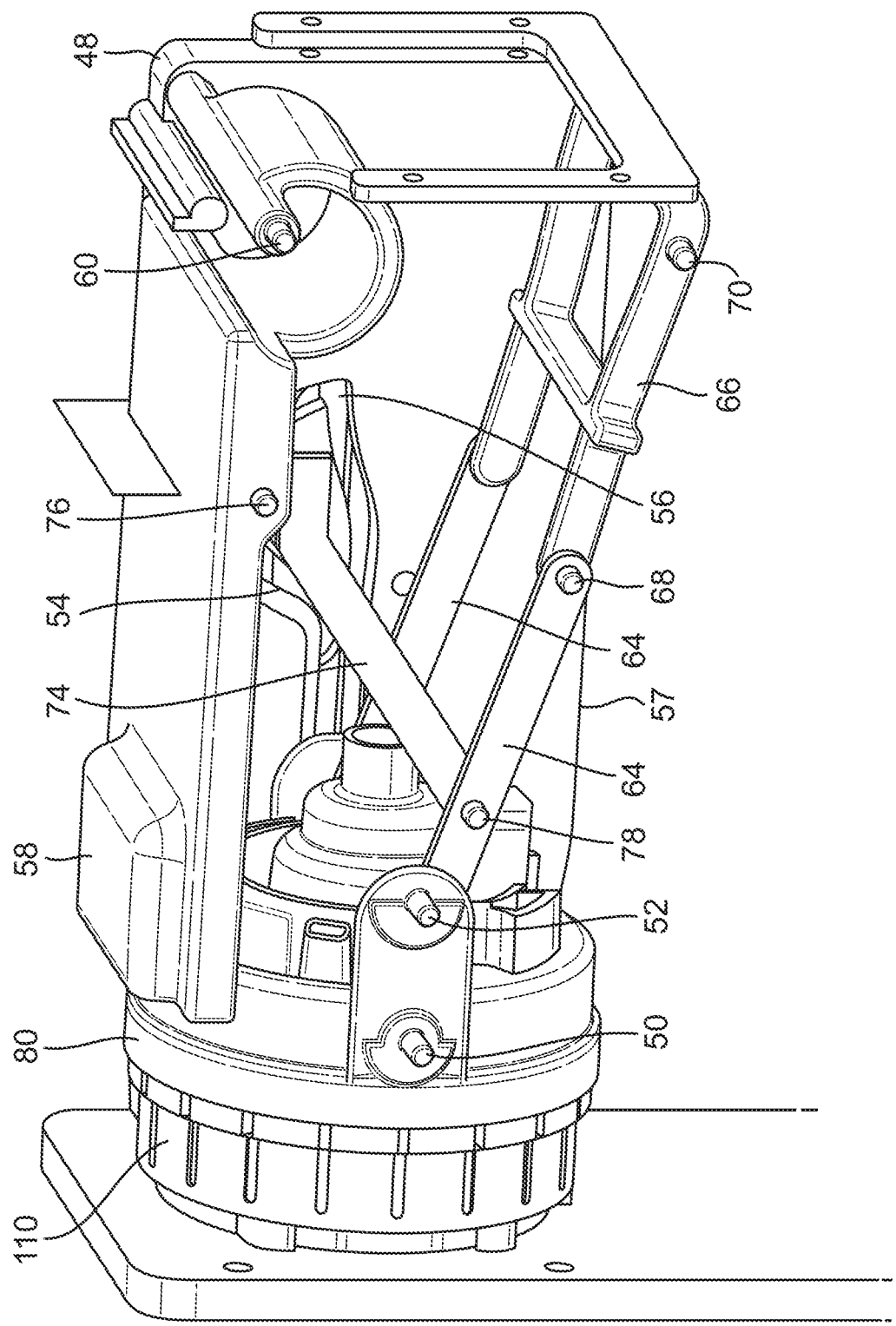

In this example the first brew chamber part 18 includes first bosses 50 and second bosses 52 as shown in FIGS. 2A and 2B. The first bosses 50 are guided in a first groove 54 of the frame 48. The second bosses 52 are guided in a second groove 56 of the frame 48. It will be appreciated that the bosses 50, 52 and grooves 54, 56 determine the path that will be followed by the first brew chamber part 18. Here the first groove 54 and the second groove 56 are provided in a side wall 57 of the frame 48. The first groove 54 extends into the side wall 57 to a first depth. The second groove 56 extends into the side wall to a second depth. The second depth is larger than the first depth. The first boss 50 has a larger diameter than the second boss 52. The first groove 54 has a larger width than the second groove 56. The width of the first groove 54 corresponds to the diameter of the first boss 50. The width of the second groove 56 corresponds to the width of the second boss 52. It will be appreciated that the first groove 54 extends along a different trajectory than the second groove 56. The different widths and depths of the grooves allow the first and second bosses 50, 52 to follow different trajectories. This construction allows a very compact construction for guiding the first and second bosses 50, 52.

The apparatus 2 includes a lever 58. The lever can be actuated manually by a user. The lever is pivotally connected to the frame 48 around a lever axis 60. The first brew chamber part 18 is connected to the frame 48 via a knee joint 62. The knee joint 62 includes a push rod 64 and a crank 66. The push rod 64 is pivotally connected to the crank 66 at a knee axis 68. The crank 66 is pivotally connected to the frame 48 at a crank axis 70. The lever 58 is connected to the knee joint 62 for actuating the first brew chamber part 18 in motion. Here the lever 58 is connected to the knee joint 62 through a lever link 74. The lever link 74 is pivotally connected to the lever 58 at a lever link axis 76. The lever link 74 is pivotally connected to the push rod 74 at a knee link axis 78.

An arresting ring 80 is arranged surrounding the first brew chamber part 18. The arresting ring 80 is axially movable relative to the first brew chamber part 18. Here, the arresting ring 80 is guided by an external surface of the first brew chamber part 18. The arresting ring is connected to the first brew chamber part via one or more resilient elements 82, here helical springs. The push rod is pivotally connected to the arresting ring 80 at a push rod axis 72. Hence, here the knee joint 62 is indirectly connected to the first brew chamber part 18, viz. via the arresting ring 80 and one or more resilient elements 82. The function of the arresting ring will be set out below.

When the lever 58 is moved in a downward direction the knee joint 62 will push the first brew chamber part 18 towards the second brew chamber part 20. Simultaneously, due to the shape of the first and second grooves 54, 56, the first brew chamber part 18 will be rotated from the upwards inclined orientation into a an aligned orientation in which an axial direction of the first brew chamber part 18 is aligned with an axial direction of the second brew chamber part 20.

As mentioned above, the apparatus 2 is arranged for selectively cooperating with either the first capsule 4A or the second capsule 4B. Here, the system 1 is arranged for automatically adjusting the brew chamber depending on whether the first or the second capsule has been inserted. This provides the advantage that no user input is required for selecting proper handling of the first or second capsule. Hence, the risk of errors is greatly reduced.

As mentioned, the second brew chamber part 20 includes an extraction plate 30 with a central portion 32 and a peripheral portion 34. Here the central portion 32 is movable in an axial direction of the second brew chamber part 20. The central portion 32 in this example includes a shaft 32' axially slidably movable with respect to the frame 48. The central portion 32 is connected to the frame 48 via a resilient member 84, here a helical spring. The resilient member 84 biases the central portion 32 into a ready position in FIGS. 1A and 1B. The ready position is an extended position in this example. The central portion 32 can be positioned in a first brewing position for cooperating with the first capsule 4A. The central portion 32 can be positioned in a second brewing position for cooperating with the second capsule 4B. In this example, the system 1 includes a locking mechanism 86 arranged for locking the central portion 32 in or near the first brewing position when the cavity 24 holds the first capsule 4A.

The locking mechanism 86 includes a locker 88. Here the locker 88 is designed as a pivotable finger, pivotable around a pivoting axis 90. The locker 88 is biased into a position pivoted away from the shaft 32'. The locker could also be biased into any other suitable position. The locking mechanism 86 further includes a pusher 92. The pusher is slidably guided in a body 94 of the second brew part 20. The pusher 92 is connected to the body 94 via a resilient member 96, here a helical spring. The resilient member 96 biases the pusher in an extended position. The first brew chamber part 18 includes an actuator 98. Here the actuator is formed by a frontal surface of the first brew chamber part 18.

Figure 3A:
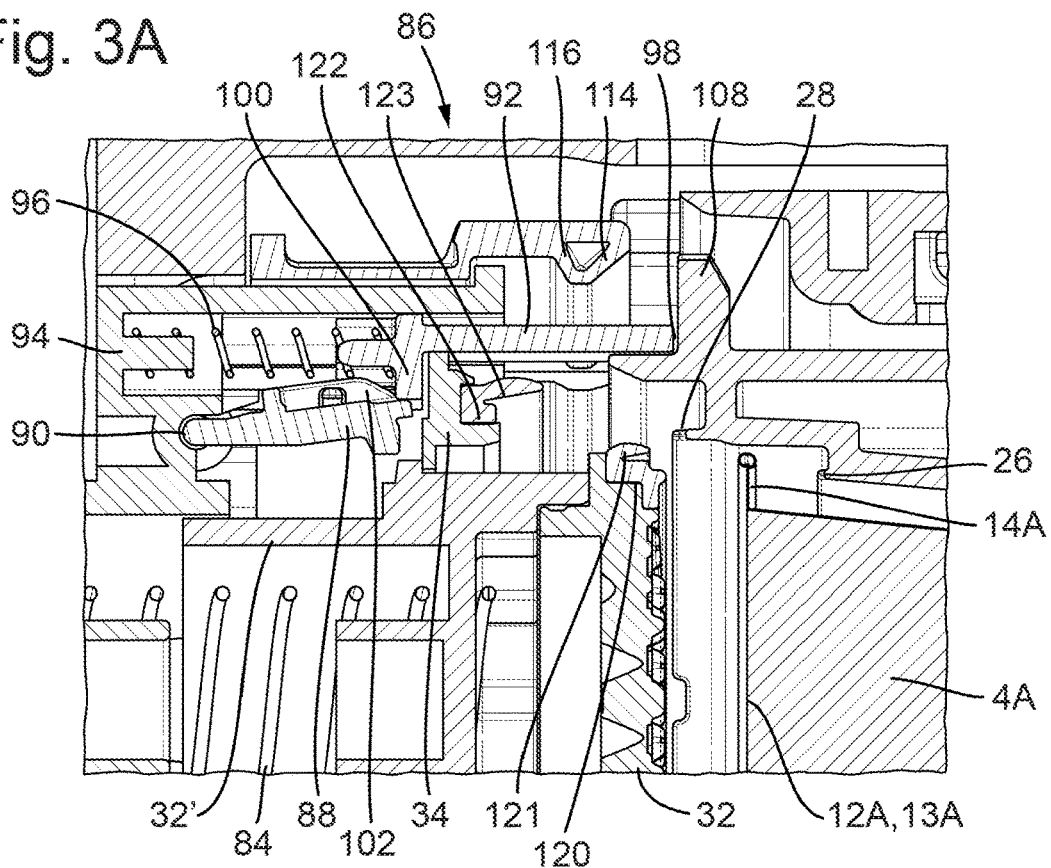
FIGS. 3A and 3B show the functioning of the locking mechanism of the system as shown in FIG. 1A when the cavity holds the first capsule.
Figure 3B:
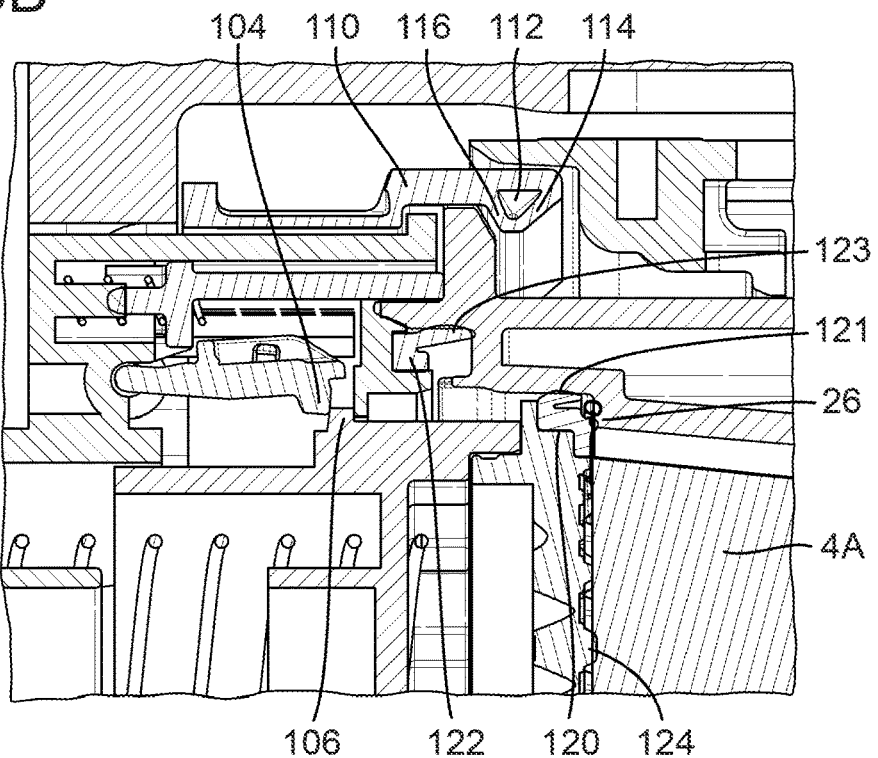

FIGS. 3A and 3B show functioning of the locking mechanism 86 when the cavity 24 holds the first capsule 4A. In this example, an outermost part of the first capsule 4A, here formed by the lid 12A, exit area 13A and/or rim 14A, is positioned rearwardly, i.e. more towards the piercing means 44, relative to the actuator 98. As a result, when advancing the first capsule 4A towards the second brew chamber part 20, the actuator 98 will touch the pusher 92 before the outermost part of the first capsule 4A will touch the central portion 32. The pusher is pushed against the biasing force of the resilient member 96. A lip 100 of the pusher 92 will slide along a sloping surface 102 of the locker 88, causing the locker 88 to pivot towards the shaft 32'. As a result, a thumb 104 of the locker 88 is placed in a path of movement of part 106 of the central portion 32 (see FIG. 3B). When the first capsule 4A is advanced further towards the second brew chamber part 20 the first capsule 4A will abut against the central portion 32. This can cause the central portion 32 to be pushed against the biasing force of the resilient member 84. The pivoted locker 88 prevents travel of the central portion 32 beyond a position where the part 106 abuts against the thumb 104. This is herein defined as the first brewing position. Hence, the first capsule 4A is arranged for moving the central portion 32 from the ready position to the first brewing position. The first capsule 4A is held between the first and second brew chamber parts 18, 20 while brewing, wherein the central portion 32 is in the first brewing position.

Figure 4A:
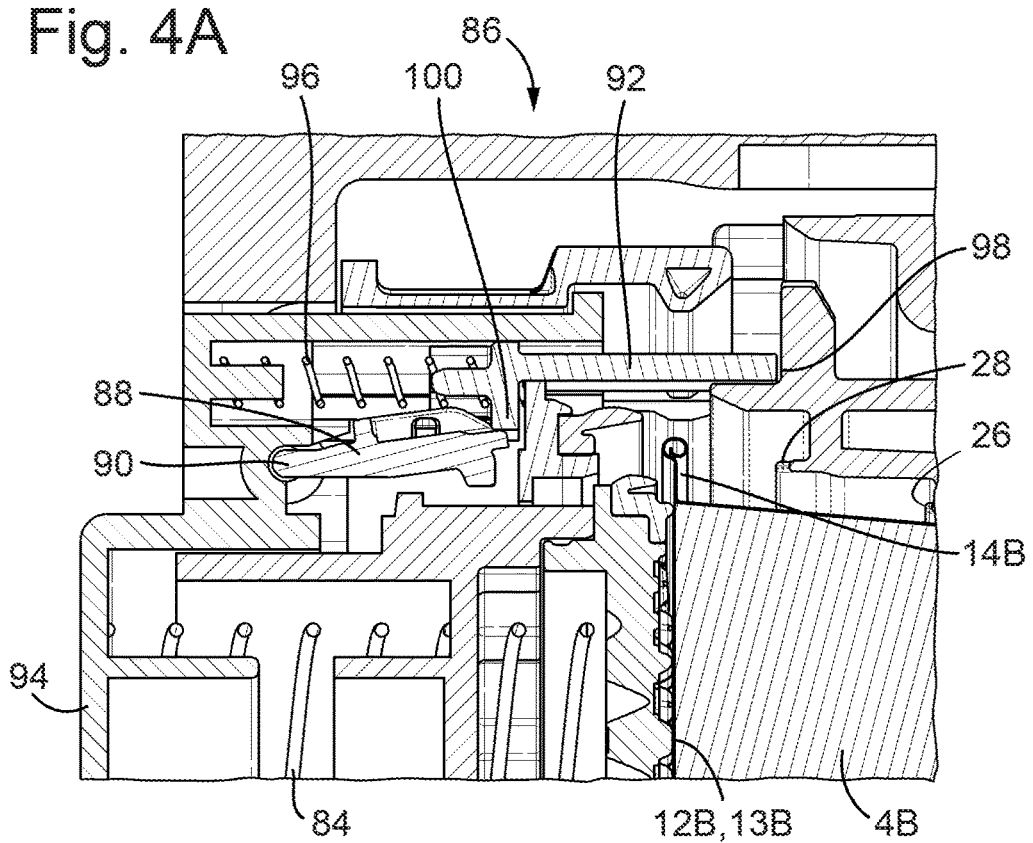
FIGS. 4A and 4B show the functioning of the locking mechanism of the system as shown in FIG. 1B when the cavity holds the second capsule.
Figure 4B:
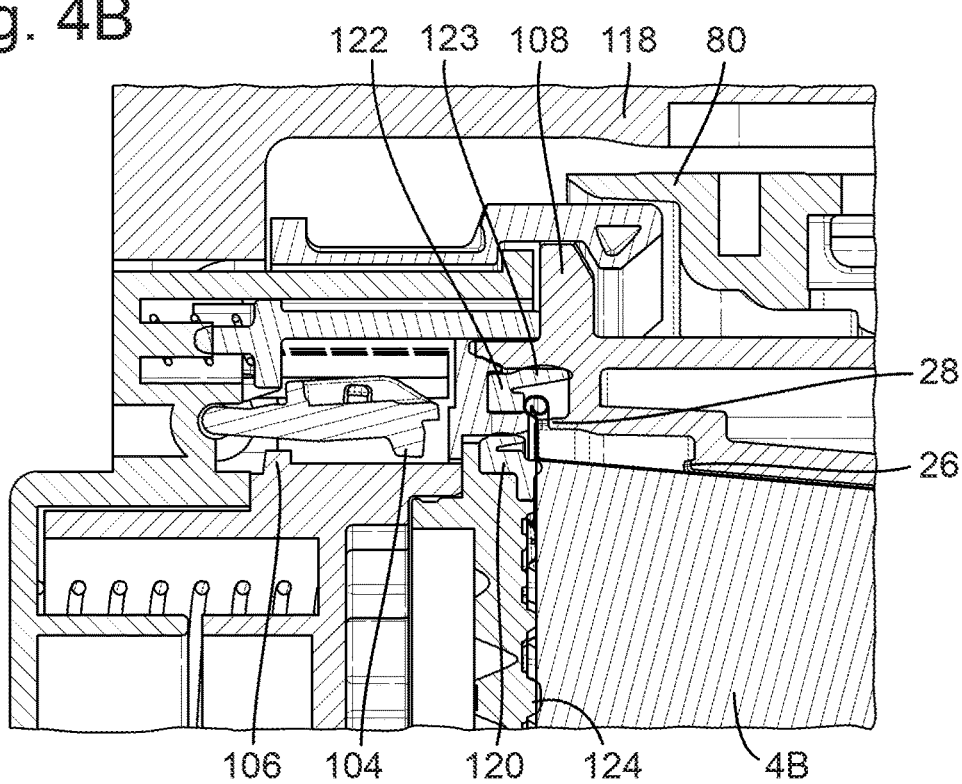

FIGS. 4A and 4B show functioning of the locking mechanism 86 when the cavity 24 holds the second capsule 4B. In this example, an outermost part of the second capsule 4B, here formed by the lid 12B, exit area 13B and/or rim 14B, is positioned forwardly, i.e. more towards the second brew chamber part 20, relative to the actuator 98. As a result, when advancing the second capsule 4B towards the second brew chamber part 20, the outermost part of the second capsule 4B will abut against the central portion 32 before the actuator 98 will touch the pusher 92. The central portion 32 is pushed against the biasing force of the resilient member 84 while the locker 88 is still pivoted away from the shaft 32'. As a result, the part 106 passed underneath the thumb 104. Only after the part 106 has passed the thumb 104 the pusher is pushed against the biasing force of the resilient member 96 by the actuator 98. The lip 100 of the pusher 92 will still slide along the sloping surface 102 of the locker 88, causing the locker 88 to pivot towards the shaft 32'. However, the part 106 has already passed the thumb 104 at that moment. In this example, the second capsule 4B pushes the central portion 32 in abutment with the body 94. This is herein defined as the second brewing position. Hence, the second capsule 4B is arranged for moving the central portion 32 from the ready position to the second brewing position. The second capsule 4B is held between the first and second brew chamber parts 18, 20 while brewing, wherein the central portion 32 is in the second brewing position.

Thus, the locking mechanism 86 is arranged for locking the central portion 32 in the first brewing position when the cavity 24 holds the first capsule 4A. It is noted that the locking may be single-sided, viz. the locking mechanism may prevent the central portion 32 from being moved beyond the first brewing position when the cavity 24 holds the first capsule 4A. However movement of the central portion 32 from the first brewing position to the ready position may be not prevented. The locking unit 86 is arranged for selectively preventing the central portion 32 being locked in or near the first brewing position when the second capsule 4B is included in the brew chamber. The locking unit 86 is arranged for selectively allowing the central portion 32 being moved into the second brewing position when the second capsule is included in the brew chamber.

When comparing FIGS. 3A and 4A it will be appreciated that while advancing the first brew chamber part 18 towards the second brew chamber part 20 the first capsule 4A is recessed further into the first brew chamber part than the second capsule 4B. Then the first lid 12A, exit area 13A and/or rim 14B is recessed further into the first brew chamber part 18 than the second lid 12B, exit area 13B and/or rim 14B.

When comparing FIGS. 3B and 4B it will be appreciated that when the brew chamber holds the first capsule 4A, the central portion 32 extends into the cavity 24. The central portion 32 extends into the first brew chamber part 18 beyond a position where the lid 12B, exit area 13B and/or rim 14B of the second capsule 4B would have been, had the second capsule been included in the first brew chamber part 18.

Figure 5A:
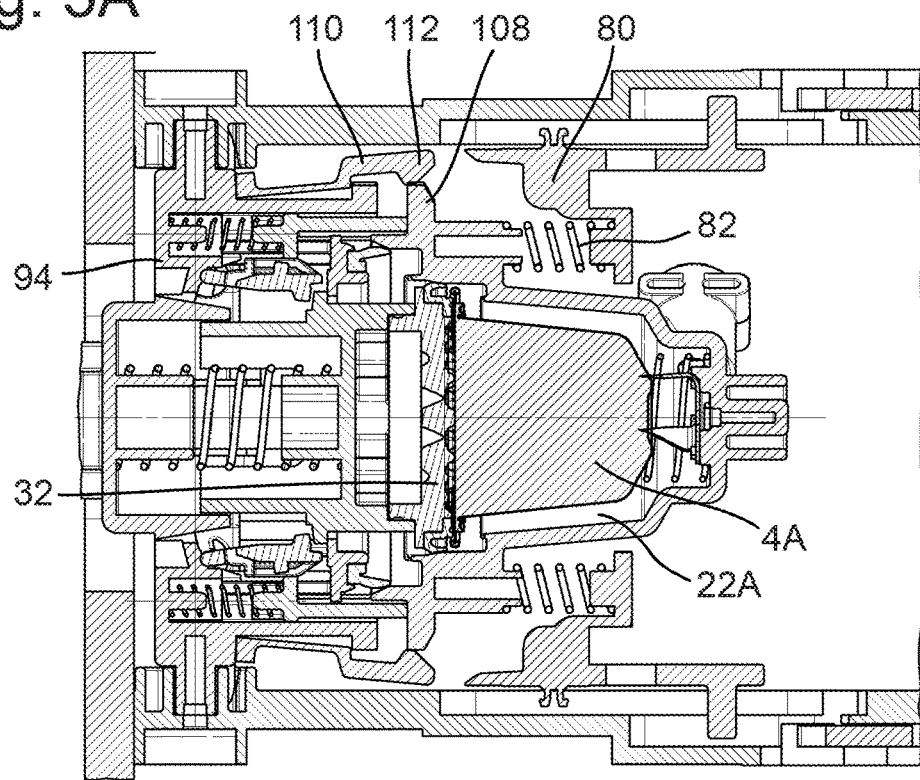
FIGS. 5A, 5B and 5C show the functioning of the arresting ring of the system as shown in FIG. 1A when the cavity holds the first capsule.
Figure 5B:
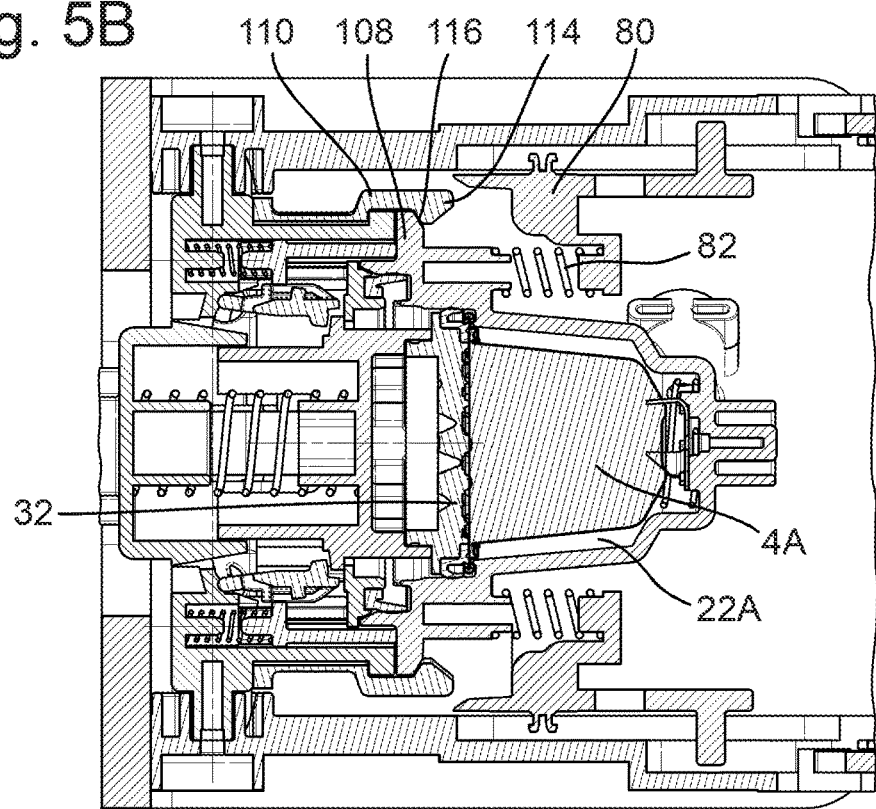
Figure 5C:
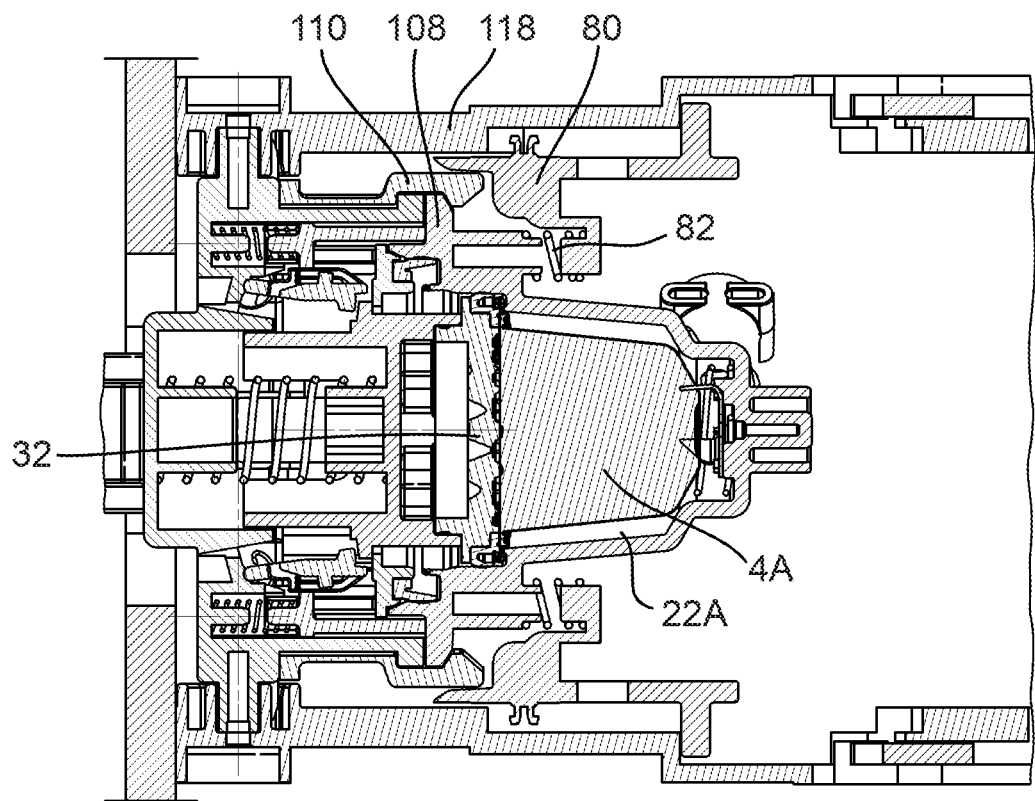

As mentioned above, the knee joint 62 is indirectly connected to the first brew chamber part 18, viz. via the arresting ring 80 and one or more resilient elements 82. FIGS. 5A-5C demonstrate functioning of the arresting ring 80.

In FIG. 5A the first capsule 4A abuts against the central portion 32 with the central portion 32 in the first brewing position. The arresting ring 80 is still in the rearward position. It will be appreciated that the lever 58 will not yet have reached its end position. The first brew chamber part 18 includes a protrusion 108. Here the protrusion 108 is a substantially annular protrusion. The protrusion 108 extends outwardly. Here the protrusion 108 forms an outermost edge of the first brew chamber part 18. The second brew chamber part 20 includes a retainer 110. Here the retainer 110 is designed as a circumferential ring of retainer lips. The retainer 110 is pivotally connected to the body 94. Here the retainer 110 is resiliently pivotally connected to the body 94. The retainer 110 includes a tooth 112. The tooth here has a first inclined surface 114 and a second inclined surface 116.

When lowering the lever 58, the arresting ring 80 will be advanced towards the second brew chamber part 20. The one or more resilient elements 82 will push the first brew chamber part 18 ahead of the arresting ring 80 until the first brew chamber part abuts against the second brew chamber 20 part, e.g. with the capsule 4A, 4B clamped in between. During this movement, the protrusion 108 will advance against the first inclined surface 114. This causes the retainer 110 to be pivoted outwardly (see FIG. 5A). Further advancing causes the protrusion 108 to pass beyond the second inclined surface 116, causing the retainer 110 to pivot inwardly (see FIG. 5B). Further lowering of the lever 58 first brew chamber part abuts against the second brew chamber 20 part will cause the one or more resilient elements 82 to be compressed. As a result, the arresting ring 80 will advance towards the second brew chamber part 20. Fully lowering the lever 58 will cause the arresting ring 80 to be interposed between the retainer 110 and a locking ring 118 (see FIG. 5C). The arresting ring 80 surrounding the retainer 110 prevents the retainer 110 from pivoting outwardly. Hence, the first brew chamber part is locked with respect to the second brew chamber part 20. The first brew chamber part is locked onto the second brew chamber part 20.

The apparatus can include a fluid supply system for supplying a fluid, e.g. a liquid, such as hot water under pressure, to the first brew chamber part 18. When the brew chamber is pressurized with the fluid for brewing a beverage, the first and second brew chamber parts 18, 20 will be pushed away from each other by the fluid pressure. The retainer 110 and arresting ring 80, and optionally the locking ring 118, will bear all, or part of, the force exerted by the fluid pressure. The arresting ring 80 interposed between the retainer 110 and the locking ring 118 increases mechanical stability. The arresting ring 80 does not have to bear all forces exerted onto it by the retainer 110, since it can abut against the locking ring 118 and transmit at least part of the forces to the locking ring 118. The locking ring 118 can be immobile, and hence can easily be reinforced. Since the first brew chamber part is locked onto the second brew chamber part 20 the frame 48 and the actuation mechanism, e.g. the knee joint, do not have to bear this force, or at least a smaller part thereof. Hence the frame and/or the actuation mechanism can be designed weaker and/or cheaper.

Although the functioning of the arresting ring 80 has been shown in FIGS. 5A-5C with respect to the first capsule 4A, it will be appreciated that the arresting ring 80 can function identically with respect to the second capsule 4B.

Figure 6A:
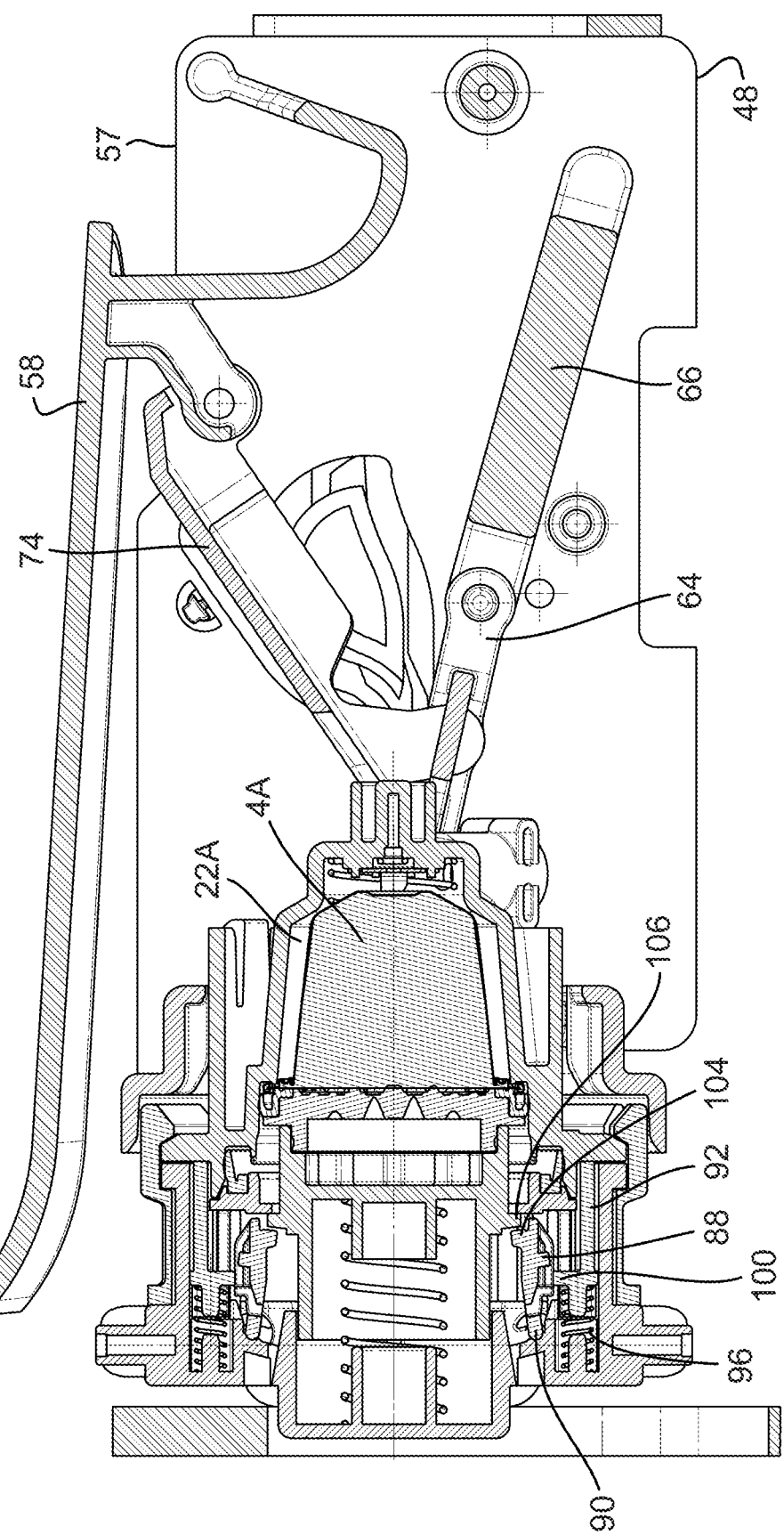

FIG. 6A shows the first capsule 4A in the brew chamber during extraction.

FIG. 6B shows the second capsule 4B in the brew chamber during extraction.

The piercing member 44 is arranged for piercing the bottom 8A, 8B of the capsule 4A, 4B. As can also be seen in FIGS. 5A-5C, in this example the piercing member 44 does not pierce the bottom 8A, 8B until the lid 12A, 12B of the capsule 4A, 4B abuts against the central portion 32 in the first or second brewing position. Thereto, stiffnesses of the resilient element 42 and the resilient member 84 can be chosen. In this example, the stiffness of the resilient element 42 is chosen to be larger than the stiffness of the resilient member 84. However, it will be appreciated that it is also possible that the stiffness of the resilient element 42 is equal to the stiffness of the resilient member 84 or that the stiffness of the resilient element 42 is smaller than the stiffness of the resilient member 84.

Once the capsule 4A, 4B is included in the brew chamber, and the bottom 8A, 8B has been pierced, a fluid, in this example hot water under pressure, can be supplied to the brew chamber. Therefore it is desired that the brew chamber is leak tight. Thereto the central portion 32 is provided with a first sealing member 120. The peripheral portion 34 is provided with a second sealing member 122. The beverage preparation apparatus 2 is arranged for preparing a quantity of a beverage, suitable for consumption, using either a first capsule 4A or a second capsule 4B. The quantity can be a predetermined quantity. The quantity can also be a user selectable, user settable, or user programmable quantity.

Referring to FIG. 3B sealing in view of the first capsule 4A is described. The first sealing member 120 is arranged for providing a fluid sealing engagement between the central portion 32 and the first brew chamber 18 part when forming the brew chamber 22A for holding the first capsule 4A. In this example, the first sealing member 120 abuts against the first brew chamber part 18 when the first capsule 4A is included in the brew chamber. This provides a seal for water being present in the cavity 24 outside the capsule 4A. This way, brewing fluid injected into the brew chamber 22A, is prevented from bypassing around the outside of the capsule 4A. In the example of FIG. 3B the first sealing member 120 includes a resilient lip 121. The resilient lip 121 is arranged to provide a self-reinforcing sealing engagement between the central portion 32 and the first brew chamber part 18 under the effect of fluid pressure in the brew chamber. In this example the first sealing member 120 abuts against the rim 14A of the first capsule 4A. The rim 14A is pressed against the first sealing member 120 by the first abutment surface 26. This provides a sealing engagement between the central portion 32 and the capsule 4A against beverage exiting the capsule 4A via the exit area 13A. It will be appreciated that here the side of the rim 14A facing away from the cup-shaped body 6A is sealed against the second brew chamber part 20. Alternatively, or additionally, the side of the rim 14A facing towards the cup-shaped body 6A can be sealed against the first brew chamber part 18. Thereto an additional seal can be provided on the first brew chamber part 18, e.g. on the first abutment surface 26, and/or on the capsule 4A, e.g. on the rim 14A. It will be clear that a seal on the capsule may be additional to the seal between the first brew chamber part 18 and the second brew chamber part 20. This may reduce the sealing effort by the first sealing member 120.

Referring to FIG. 4B sealing in view of the second capsule 4B is described. The second sealing member 122 is arranged for providing a fluid sealing engagement between the peripheral portion 34 and the first brew chamber 18 part when forming the brew chamber 22B for holding the second capsule 4B. In this example, the second sealing member 122 abuts against the first brew chamber part 18 when the second capsule 4B is included in the brew chamber. This provides a seal for water being present in the cavity 24 outside the capsule 4B. In the example of FIG. 4B the second sealing member 122 includes a resilient lip 123. The resilient lip 123 is arranged to provide a self-reinforcing sealing engagement between the peripheral portion 34 and the first brew chamber part 18 under the effect of fluid pressure in the brew chamber. In this example the second sealing member 122 abuts against the rim 14B of the second capsule 4B. The rim 14B is pressed against the second sealing member 122 by the second abutment surface 28. This may provide a sealing engagement between the peripheral portion 34 and the capsule 4B against beverage exiting the capsule 4B via the exit area 13B. In FIG. 4B the first sealing member 120 provides a sealing engagement between the central portion 32 and the peripheral portion 34 when forming the brew chamber 22B for holding the second capsule 4B. This sealing engagement between the central portion 32 and the peripheral portion 34 can be self-reinforcing. Thereto the engagement between peripheral portion 34 and the second capsule 4B may allow brewing fluid to pass to the first sealing member 120. Hence, the first sealing member 120 provides a sealing engagement between the central portion 32 and the capsule 4B against beverage exiting the capsule 4B via the exit area 13B. It will be appreciated that here the side of the rim 14B facing away from the cup-shaped body 6B, which rim may or may not be covered by a lid, for example by a foil, is sealed against the second brew chamber part 20. Alternatively, or additionally, the side of the rim 14B facing towards the cup-shaped body 6B can be sealed against the first brew chamber part 18. Thereto an additional seal can be provided on the first brew chamber part 18, e.g. on the second abutment surface 28, and/or on the capsule 4B, e.g. on the rim 14B. It will be clear that a seal on the capsule may be additional to the seal between the first brew chamber part 18 and the second brew chamber part 20. This may reduce the sealing effort by the second sealing member 122.

When the fluid under pressure is supplied to the capsule 4A, 4B in the brew chamber, the exit area 13A, 13B may open against the extraction plate 30. The extraction plate 30 in this example includes a plurality of relief elements 124. Here the relief elements 124 are truncated pyramids. A rise in pressure inside the capsule 4A, 4B can cause the exit area 13A, 13B to tear against the relief elements allowing beverage to exit the capsule 4A, 4B.

The beverage can pass through the extraction plate 30 via apertures in the extraction plate. Next the beverage can flow to an outlet 126. From the outlet 126 the beverage can flow into a receptacle, such as a cup.

Figure 7A:
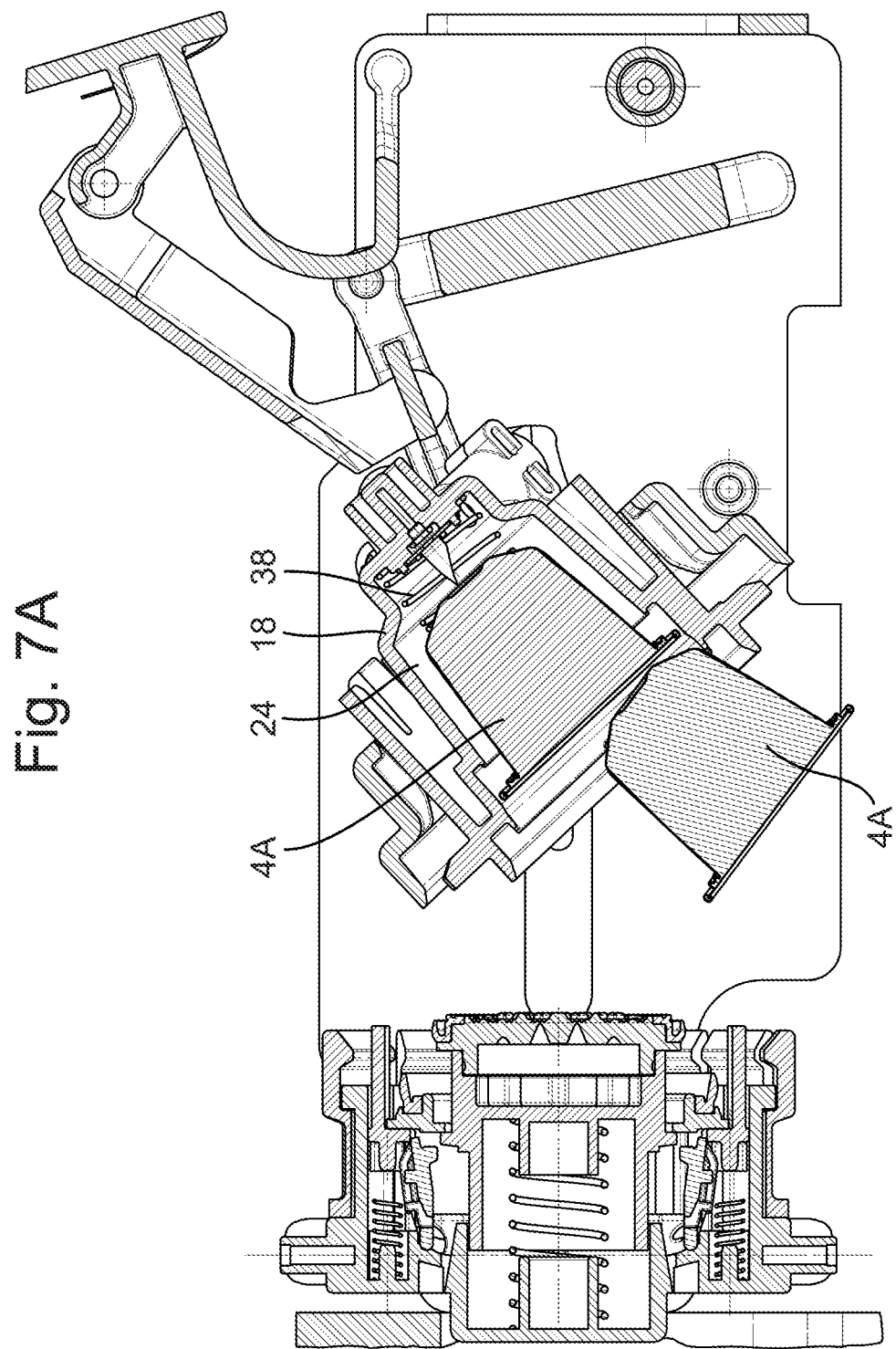

Once the beverage has been brewed, the lever 58 can be moved upwardly. This causes the arresting ring 80 to be moved away from the retainer 110. Next, the first brew chamber part 18 will be moved rearwardly. The second inclined surface 116 of the retainer 110 can allow the retainer to pass the projection 108. The first brew chamber 18 part will move away from the second brew chamber part 20. The central portion 32 will return to the ready position. The bosses 50, 52 and grooves 54, 56 determine the path that will be followed by the first brew chamber part 18. As shown in FIGS. 7A and 7B the first brew chamber part will swivel downwardly. This promotes ejection of the used capsule 4A, 4B from the cavity 24 under the effect of gravity. The ejector 38 can assist in pushing the capsule 4A, 4B off the piercing member 44 and out of the cavity 24. The used capsule 4A, 4B can fall into a waste basket of the apparatus 2.

Figure 8A:
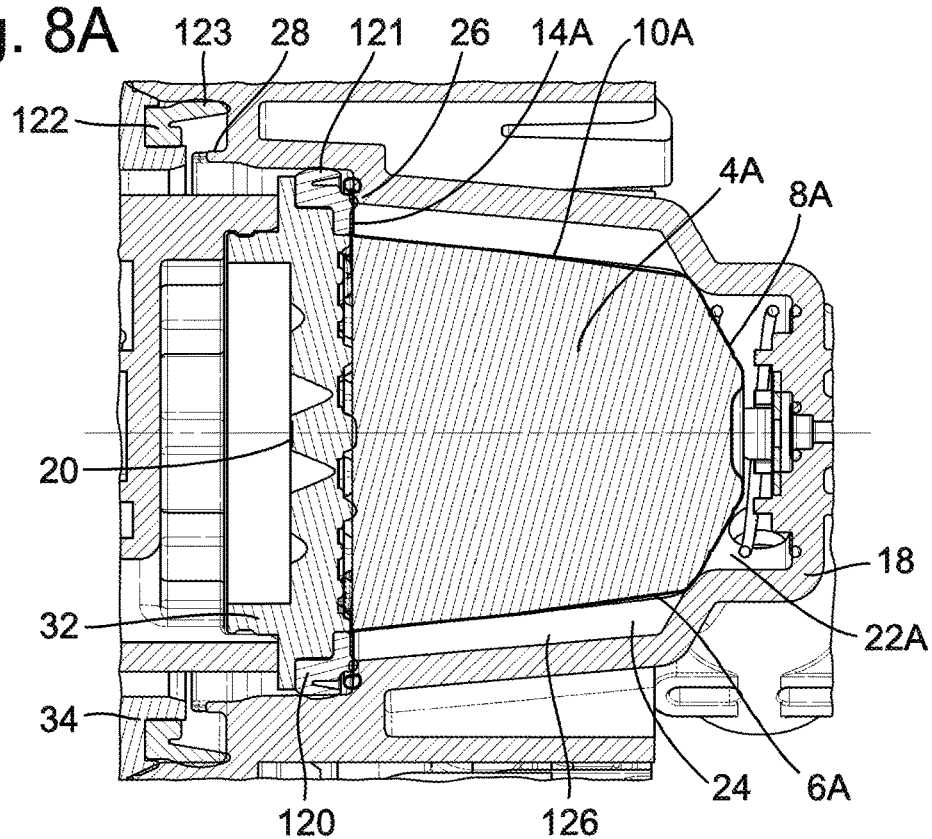
FIGS. 8A and 8B show an example of a first capsule and second capsule, respectively, inserted in the brew chamber formed by the first brew chamber part and the second brew chamber part.
Figure 8B:
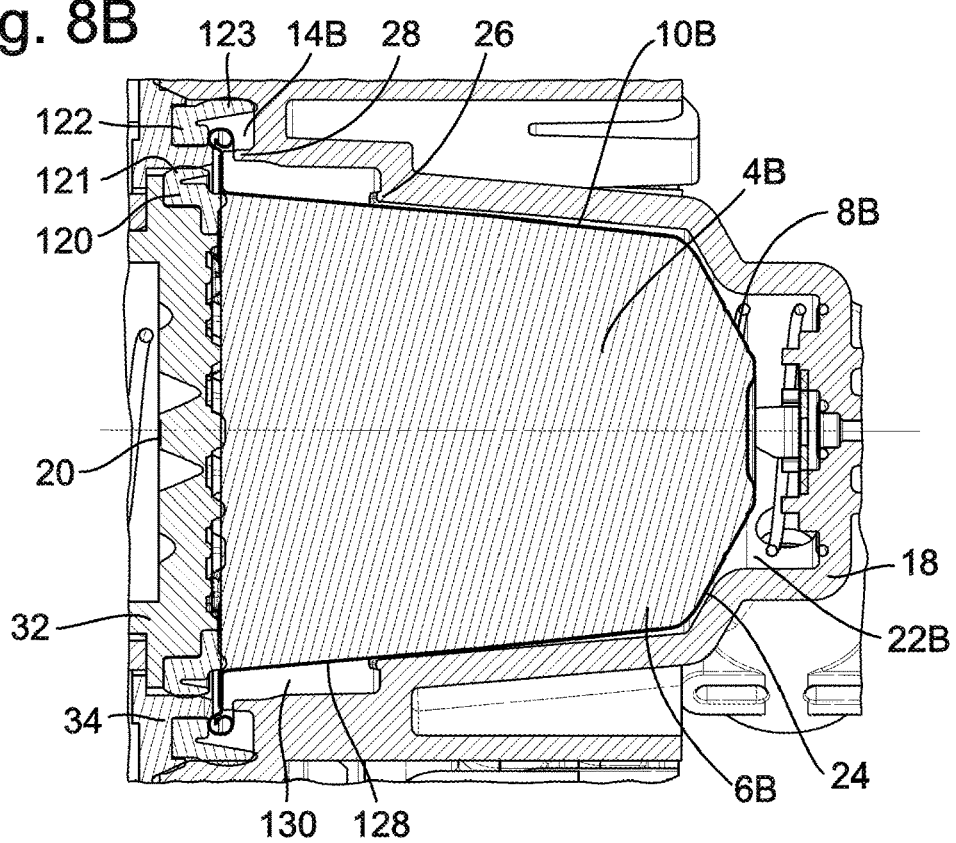

In this example the first and second capsules 4A, 4B are designed to make a similar visual impression. FIG. 8A shows an example of a first capsule 4A inserted in the brew chamber 22A formed by the first brew chamber part 18 and the second brew chamber part 20. It will be appreciated that the circumferential wall 10A is narrower than the cavity 24 at that location. As a result there is a first volume 126 surrounding the first capsule 4A inside the cavity 24. FIG. 8B shows an example of a second capsule 4B inserted in the brew chamber 22B formed by the first brew chamber part 18 and the second brew chamber part 20. It will be appreciated that a part 128 of the circumferential wall 10B is narrower than the cavity 24 at that location. This part 128 is formed by the part of the circumferential wall 10B extending beyond the first abutment surface 26. As a result there is a second volume 130 surrounding the second capsule 4B inside the cavity 24.

It is noted that the first volume 126 is not occupied by the first capsule 4A when the brew chamber 22A holds the first capsule 4A. However, this first volume 126 is occupied by part of the second capsule 4B when the brew chamber 22B holds the second capsule 4B. The second volume 130 is not occupied by the second capsule 4B when the brew chamber holds the second capsule 4B. This second volume 130 receives the central portion 32 of the extraction plate 30 when the brew chamber holds the first capsule 4A.

When brewing a beverage using the first capsule 4A, the first volume 126 will fill with fluid, such as water, which fluid is not used for brewing the beverage. This fluid can be drained to the waste basket after brewing. When brewing a beverage using the second capsule 4B, the second volume 130 will fill with fluid, such as water, which fluid is not used for brewing the beverage. This fluid can be drained to a container, e.g. the waste basket, after brewing. In this example the first volume 126 is substantially equal to the second volume 130. Hence, the volume of fluid directed to the waste basket is substantially equal when brewing a beverage using a first capsule 4A and when brewing a beverage using a second capsule 4B.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the central portion of the extraction plate includes a plurality of relief elements. The peripheral portion includes no relief elements. However, it will be appreciated that the peripheral portion may also include relief elements. The extraction plate and the second exit area can be adapted to each other such that a flow resistance of the second exit area when opened is less than a flow resistance of the first exit area when opened. The extraction plate and the second exit area may be adapted to each other such that the second exit area tears on the extraction plate over a larger surface area than the first exit area. The extraction plate and the second exit area may be adapted to each other such that the second exit area tears on the extraction plate on more locations than the first exit area. Outer relief elements may be designed for tearing both the first and second exit area wherein the second exit area tears on the outer relief elements over a larger surface area than the first exit area. The extraction plate can include relief elements of a first type and at least one relief element of a second type, wherein the relief elements of the first type are arranged within an area corresponding to the first exit area, and the at least one relief element of the second type being arranged within an area corresponding to the second exit area and outside the area corresponding to the first exit area. The relief element of the second type may have a sharper edge than the relief elements of the first type. The second exit area may include a weakened zone. The weakened zone may be located in a peripheral area of the second exit area.

In the examples, the first and second capsules have substantially the same shape. It is also possible to provide a third capsule having a different shape. The third capsule can e.g. be shaped to substantially fill the brew chamber when the central portion is in the first brewing position. It is also possible to provide a fourth capsule having a different shape. The fourth capsule can e.g. be shaped to substantially fill the brew chamber when the central portion is in the second extraction position.

In the examples, the capsule body and lid are made of aluminum foil, preferable polymer coated aluminum foil to allow easy welding of the lid to the body. It will be appreciated that the capsule body and/or lid can be made of a wide variety of materials considered suitable by the skilled person and capable of being processed into a sheet, film or foil using techniques conventionally known in the art such as extrusion, co-extrusion, injection molding, blow molding, vacuum forming etc. Suitable materials for the capsule body and/or lid include, without being limited thereto, plastic materials, in particular thermoplastic materials, for example a polyolefin polymer, for example polyethylene or polypropylene, PVC, polyesters for example polyethylene terephthalate (PET); metal foils such as aluminum, stainless steel, metal alloys etc.; or sheets of a woven or a non-woven or otherwise processed fibrous material, like paper, polyester, etc.; or combinations thereof, e.g. multilayers. The material for the capsule can be a biodegradable polymer or another biodegradable material. The skilled person will be capable of selecting the appropriate material taking into account the envisaged use with food material and any other relevant circumstances during use of the capsule. The thickness of the sheet or foil may be chosen such that a form stable capsule is provided. The thickness of the sheet or foil may vary with the nature of the material.

In the examples, the capsules are closed capsules. It is also possible to provide the system with an open capsule. The open capsule is open prior to insertion into the apparatus. The open capsule can be pre-perforated. The open capsule can be packaged in a hermetically sealed package which has to be removed before inserting the open capsule in the apparatus. In the examples, the capsules are pierced by the piercing means. It is also possible to provide the system with a capsule that is not pierced by the piercing means. Such capsule can e.g. include an entrance filter. In the examples, the capsules open against the extraction plate. It is also possible to provide the system with a capsule that does not open against the extraction plate. Such capsule can e.g. include an exit filter.

In the examples, the capsules themselves do not include a sealing member. It will be appreciated that it is possible to provide the capsule with a sealing member, e.g. a resilient sealing member. The sealing member can e.g. be placed on the rim, e.g. on the side facing towards the cup-shaped body or on the side facing away from the cup-shaped body. Alternatively, or additionally, a sealing member can be provided on the circumferential wall and/or on the bottom.

In the examples the arresting ring and retainer extend along substantially the entire perimeter of the first and second brew chamber parts. This provides particular good locking of the two brew chamber parts onto each other. However, it will be appreciated that it is also possible that the arresting ring and retainer include arresting means and retaining means at one or more discrete positions along the perimeter, e.g. at two, three, four, six or eight positions.

It will be appreciated that it is also possible to provide a first apparatus arranged for brewing a beverage using a first capsule, but incapable of brewing a beverage using a second capsule. Such first apparatus can be included in a system with the apparatus as described in relation to the figures and a first capsule and optionally a second capsule.

It will be appreciated that it is also possible to provide a second apparatus arranged for brewing a beverage using a second capsule, but incapable of brewing a beverage using a first capsule. Such second apparatus can be included in a system with the apparatus as described in relation to the figures and a second capsule and optionally a first capsule.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A system for preparing a quantity of beverage suitable for consumption, including:
   an exchangeable capsule having a body with a rim and an exit face attached to the rim, and
   an apparatus for preparing a quantity of beverage suitable for consumption, said apparatus including a first brew chamber part having a cavity for holding the exchangeable capsule, and a second brew chamber part for closing the first brew chamber part around the exchangeable capsule, and
   wherein the first brew chamber part has a first substantially annular abutment surface and a second substantially annular abutment surface in the cavity,
   wherein a diameter of the second annular abutment surface is larger than a diameter of the first annular abutment surface,
   wherein the first substantially annular abutment surface and the second substantially annular abutment surface are immobile relative to each other, and
   wherein the second abutment surface is arranged for abutting the rim there against when the cavity holds the exchangeable capsule.

2. The system according to claim 1, wherein the system further includes an additional exchangeable capsule having a body with a rim and a exit face attached to the rim, wherein the cavity of the first brew chamber part of the apparatus is arranged for selectively holding one of the exchangeable capsule and the additional exchangeable capsule, wherein the second brew chamber part is arranged for closing the first brew chamber part around the exchangeable capsule or the additional exchangeable capsule, wherein the first abutment surface is arranged for abutting the first rim there against when the cavity holds the additional exchangeable capsule, and wherein the second rim has a larger diameter than the first rim.

3. The system according to claim 1, wherein the first substantially annular abutment surface is spaced from the second substantially annular abutment surface in an axial direction of the first brew chamber part.

4. The system according to claim 2, wherein an axial length of the exchangeable capsule is larger than an axial length of the additional exchangeable capsule.

5. The system according to claim 1, wherein the second substantially annular abutment surface is arranged at an open end of the cavity.

6. The system according to claim 1, wherein the second brew chamber part has an extraction plate for abutting against the exit face of the exchangeable capsule and optionally the exit face of the additional exchangeable capsule.

7. The system according to claim 6, wherein the extraction plate includes a central portion and a peripheral portion, the central portion being axially movable relative to the peripheral portion.

8. The system according to claim 7, wherein the peripheral portion is arranged to abut against the exit face of the exchangeable capsule when the cavity holds the exchangeable capsule while brewing.

9. The system according to claim 6, wherein the extraction plate includes a central portion and a peripheral portion, the central portion being axially movable relative to the peripheral portion, and wherein the peripheral portion is arranged to abut against the first brew chamber part when the cavity holds the additional exchangeable capsule while brewing.

10. The system according to claim 7, wherein the central portion is arranged to abut against the exit face of the exchangeable capsule when the cavity holds the exchangeable capsule while brewing.

11. The system according to claim 6, wherein the extraction plate includes a central portion and a peripheral portion, the central portion being axially movable relative to the peripheral portion, and wherein the central portion is arranged to abut against the exit face of the additional exchangeable capsule when the cavity holds the additional capsule while brewing.

12. The system according to claim 4, wherein the exchangeable capsule and the additional exchangeable capsule have substantially the same length to diameter ratio.

13. The system according to claim 2, wherein the first brew chamber part and the additional exchangeable capsule are adapted to each other such that the additional exchangeable capsule centers in the cavity by means of the rim.

14. The system according to claim 1, wherein the first abutment surface provides the cavity with a stepped shape.

15. The system according to claim 1, wherein the first generally annular abutment surface is continuously annular and wherein the second generally annular abutment surface is continuously annular.

16. An apparatus for preparing a predetermined quantity of beverage suitable for consumption, the apparatus being arranged for preparing a predetermined quantity of beverage suitable for consumption using an exchangeable capsule having a body and a rim, the apparatus including a first brew chamber part having a cavity for holding the exchangeable capsule and a second brew chamber part for closing the first brew chamber part around the exchangeable capsule, the first brew chamber part having a first annular abutment surface in the cavity, wherein the brew chamber part has a second annular abutment surface, the first annular abutment surface and the second annular abutment surface being immobile relative to each other, the second abutment surface being arranged for abutting the rim there against when the cavity holds the exchangeable capsule and wherein a diameter of the second annular abutment surface is larger than a diameter of the first annular abutment surface.

17. The apparatus according to claim 16, wherein the apparatus is further arranged for preparing a predetermined quantity of beverage suitable for consumption using an additional exchangeable capsule having a body and a rim, the cavity of the brew chamber part being arranged cavity for selectively holding one of the exchangeable capsule and the additional exchangeable capsule, the first abutment surface being arranged for abutting the rim of the additional exchangeable capsule there against when the cavity holds the additional exchangeable capsule.

18. The apparatus according to claim 16, wherein the first substantially annular abutment surface is spaced from the second substantially annular abutment surface in an axial direction of the first brew chamber part.

* * * * *